US010257804B2

(12) United States Patent
Ubeda Castellanos et al.

(10) Patent No.: US 10,257,804 B2
(45) Date of Patent: Apr. 9, 2019

(54) LOCATION OF TERMINALS IN A COMMUNICATIONS NETWORK

(71) Applicant: Telefonaktiebolaget LM Ericsson (publ), Stockholm (SE)

(72) Inventors: Carlos Ubeda Castellanos, Madrid (ES); Mariano Fernandez Navarro, Malaga (ES); Juan Antonio Garcia Fernandez, Malaga (ES); Antonio Jurado Navas, Malaga (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 3 days.

(21) Appl. No.: 15/124,759

(22) PCT Filed: Mar. 12, 2014

(86) PCT No.: PCT/EP2014/054875
§ 371 (c)(1),
(2) Date: Sep. 9, 2016

(87) PCT Pub. No.: WO2015/135581
PCT Pub. Date: Sep. 17, 2015

(65) Prior Publication Data
US 2017/0019877 A1    Jan. 19, 2017

(51) Int. Cl.
*H04W 64/00* (2009.01)
*G01S 5/10* (2006.01)
(Continued)

(52) U.S. Cl.
CPC .............. *H04W 64/003* (2013.01); *G01S 5/10* (2013.01); *H04L 45/02* (2013.01); *H04L 12/44* (2013.01)

(58) Field of Classification Search
CPC ....... H04W 64/003; H04L 12/44; H04L 45/02
See application file for complete search history.

(56) References Cited

U.S. PATENT DOCUMENTS

| 6,937,866 B2 | 8/2005 | Duffett-Smith et al. |
| 2004/0202119 A1 | 10/2004 | Edge |

(Continued)

FOREIGN PATENT DOCUMENTS

| CN | 101783975 | 7/2010 |
| CN | 103513229 | 1/2014 |
| EP | 1 137 301 A1 | 9/2001 |

OTHER PUBLICATIONS

A Distributed Heuristics of Localization in Wireless Sensor Network by Wei Wang and Boon-Hee Soong—2006.

(Continued)

*Primary Examiner* — Mazda Sabouri
(74) *Attorney, Agent, or Firm* — Patent Portfolio Builders, PLLC

(57) ABSTRACT

A method (400, 500) of identifying nodes in a communications network is disclosed, the nodes being for use in locating wireless terminals within the network based upon reports from the wireless terminals of transmissions received from the nodes. The method (400, 500) comprises prioritizing combinations of nodes in which at least three nodes are located around a reference node in a configuration satisfying similarity criteria to an idealized star configuration, wherein an idealized star configuration comprises three nodes evenly angularly distributed around, and at the same distance from, a reference node. Also disclosed is a method (100, 200) for locating a plurality of wireless terminals in a communications network, the network comprising a plurality of network nodes at known locations, wherein the nodes emit wireless transmissions in an unsynchronized manner, such that a time difference exists between the emission time of corresponding transmissions from different nodes. The method comprises receiving reports from a plurality of wireless terminals of transmissions received from the network nodes (110, 210), selecting a subset of network nodes (Continued)

(120, 220) and identifying a plurality of reports reporting transmissions from all of the nodes of the subset (130, 230). The method further comprises simultaneously determining the locations of the wireless terminals generating the identified reports and the time differences between emission times of transmissions from the nodes of the subset (140, 240). Also disclosed are a computer program product for carrying out the above methods and a network element (300, 700, 800) configured to carry out the above methods.

10 Claims, 18 Drawing Sheets

(51) Int. Cl.
  *H04L 12/751* (2013.01)
  *H04L 12/44* (2006.01)

(56) References Cited

U.S. PATENT DOCUMENTS

| | | | | |
|---|---|---|---|---|
| 2005/0198286 A1* | 9/2005 | Xu | ............ | H04L 45/02 709/225 |
| 2009/0232113 A1* | 9/2009 | Tamaki | ............ | H04W 56/003 370/337 |
| 2011/0084881 A1* | 4/2011 | Fischer | ............ | G06F 17/30241 342/451 |
| 2011/0227791 A1 | 9/2011 | Lin et al. | | |
| 2015/0148055 A1* | 5/2015 | Alles | ............ | G01S 5/0036 455/456.1 |

OTHER PUBLICATIONS

Comparison of Anchor Selection Algorithms for Improvement of Position Estimation During the Wi-Fi Localization Process in Disaster Scenario by Oleksandr Artemenko et al.; 37th Annual IEEE Conference on Local Computer Networks; LCN 2012, Clearwater, Florida—2012.
Evaluation of Time-Delay Based Geolocation Algorithm in Real UMTS Networks by Carlos Úbeda et al.—2010.
Geometrical Determination of PDOP by Alan H. Phillips; Navigation: Journal of the Institute of Navigation; vol. 331, No. 4, Winter 1984-85; Received Nov. 1983, Revised May 1984.
International Search Report for International application No. PCT/EP2014/054875—dated Oct. 30, 2014.
The State Intellectual Property Office of the People's Republic of China for Application No. 2014/80078831.9, Office Action and Search Report dated Jul. 2, 2018 (with translation).

* cited by examiner

LOCATION OF TERMINALS IN A COMMUNICATIONS NETWORK

PRIORITY

This nonprovisional application is a U.S. National Stage Filing under 35 U.S.C. § 371 of International Patent Application Serial No. PCT/EP2014/054875, filed Mar. 12, 2014, and entitled "Location of Terminals in a Communications Network."

TECHNICAL FIELD

The present invention relates to a method and apparatus for identifying nodes in a communications network for use in locating wireless terminals within the network. The network may for example be an asynchronous network. The invention also relates to a method and apparatus for locating a plurality of wireless terminals in a communications network. The invention also relates to a computer program product configured, when run on a computer, to carry out a method for identifying nodes or for locating a plurality of wireless terminals.

BACKGROUND

It is often necessary or desirable to be able to locate user equipment devices (UE) within a communications network. Certain services offered via the network may be geographically dependent, and several aspects of network management may require the accurate location of UEs within the network and tracking their movements through the network. These network management tasks may include handoff control, code division, and Location Assisted Network Management, such as Location-Aided Handover for example.

Global positioning satellites may be used by some UEs to determine their geographical location. However, not all UEs are equipped with GPS capability, and even when available to a UE, GPS based location is not always reliable, as UEs can experience difficulty in receiving GPS signals owing to the surrounding environment. Urban and/or indoor environments may be particularly problematic, and many UEs are predominantly located in such environments. Difficulties may also be encountered in the sharing of GPS positioning information with a network entity and with access costs. Consequently, it would be desirable for networks to be able to locate UEs within the network independently, without reliance on external GPS technology.

The increasing availability of mobile devices, and improvements in sensing technologies, have made available a large amount of information which may be used in algorithms for locating UEs within a network without additional positioning information from satellites. This information may be used in both synchronous and asynchronous networks, although in asynchronous networks, the task is rendered more complicated by timing considerations, as discussed below.

In asynchronous networks, such as UMTS networks for example, the basestations and UEs within the network are not required to lock to a stable reference clock. Consequently, the timing signal in basestations and UEs is less accurate than in a synchronous communication system, and the phase of the timing signal may drift over time. This timing difference can greatly complicate the process of locating UEs within the network.

Location processes in communication networks generally require an initial assistance step, in which information is provided for position estimation. A series of measurements may then be carried out by a UE and reported to a location entity, which may then determine the position of the UE based on the reported measurements. The measurements may include the angle of arrival (AOA) of a signal, received signal strength (RSS) of a signal, time of arrival (TOA) of a signal and/or time difference of arrival (TDOA) of two signals. TDOA has been adopted by the 3rd Generation Partnership Project, where it is referred to as observed time difference of arrival (OTDOA), as it represents the perceived time difference between arrival of signals from two different basestations.

OTDOA techniques involve the application of a multilateration process based on measurement reports received from UEs. This process is described below with reference to FIG. 1. The process uses the propagation delay of radio signals received at a UE from several different basestations to infer the geographic distance of the UE from the basestations. In a first step, signals received from three or more separate basestations at known locations (e.g. sites 1 to 4 of FIG. 1) are measured by a single UE 5 and reported in the form of a measurement report. The propagation delay measurements of the report are manipulated to take the form of time difference measurements, as opposed to absolute time measurements. Each time difference measurement represents the difference in arrival time between two signals received from two different basestations, for example site 1 and site 2 or site 1 and site 3. The time differences may then be converted into constant distance differences between the UE and the two basestations, allowing the plotting of a hyperbola along which the UE must be located. The time difference between signals received from sites 1 and 3 thus results in Hyperbola 3-1, the time difference between signals received from sites 1 and 4 results in the Hyperbola 4-1 etc. In the illustrated case of four sites, three time differences may be measured, resulting in three hyperbolae along which the UE must be located. The intersection of the hyperbolae represents the location of the UE. It will be appreciated from the above description and from FIG. 1 that a minimum of three sites, generating two hyperbolae, is necessary to solve for the position coordinates of a single UE.

OTDOA offers advantages in that the required measurements may be performed with a UE in idle mode, and it offers a high degree of accuracy without requiring external technologies such as GPS. However, in asynchronous networks, the process is complicated by the timing difference in signals transmitted from the different basestations. The difference in observed arrival time in signals in an asynchronous network is not only a function of the geographic location of the UE with respect to the transmitting basestations, but is also dependent on the difference in the time at which the signals were transmitted from the basestations. This difference in transmission time between two basestations is known as the relative time difference (RTD) between the basestations. In order to generate the hyperbolae and solve for UE position, it is necessary to know the RTDs of the basestations involved in addition to their geographic location and the reported differences in arrival time. The drift effects discussed above mean that RTDs are not dynamically stable but vary with time, meaning they must be constantly updated. In order to address this, location measurement units (LMUs) are introduced into the network architecture to perform timing measurements for all local basestations and to store these measurements for later use in locating UEs within the network.

LMUs introduce additional cost and complexity to the network, and it would thus be desirable to be able to locate UEs without relying on the measured RTDs provided by LMUs. Various methods have been proposed to address this challenge, but all suffer from drawbacks of one kind or another, for example requiring information that may not always be available, or placing a heavy computational load on the locating entity through multiple rounds of iteration.

Another problem encountered in positioning algorithms in both synchronous and asynchronous networks is error generation as a result of local minima. If the global equation set, formed for example by the hyperbolae of FIG. 1, includes both a local and global minimum, a positioning algorithm is at risk of converging upon the local minimum, and so generating a positional error when locating a UE. This problem is encountered to a greater or lesser extent in the majority of positioning methods offering an alternative to GPS based techniques.

SUMMARY

It is an aim of the present invention to provide a method and apparatus which obviate or reduce at least one or more of the disadvantages mentioned above.

According to a first aspect of the present invention, there is provided a method of identifying nodes in a communications network for use in locating wireless terminals within the network based upon reports from the wireless terminals of transmissions received from the nodes. The method comprises prioritising combinations of nodes in which at least three nodes are located around a reference node in a configuration satisfying similarity criteria to an idealised star configuration. An idealised star configuration comprises three nodes evenly angularly distributed around, and at the same distance from, a reference node.

In some examples, an idealised star configuration may further comprise the three nodes located at a distance from the reference node that is above a minimum threshold.

In some examples, the similarity criteria may comprise an angular distribution around the reference node that differs from even angular distribution by less than a maximum amount, and a ratio of maximum to minimum distance from the reference node to any one of the three nodes that is less than a defined maximum ratio.

In further examples, the similarity criteria may comprise an angular distribution within 20 degrees of even distribution around the reference node and a maximum ratio of maximum to minimum distance from the reference node to any one of the three nodes of 3:1.

In some examples, prioritising may comprise weighting combinations of at least four nodes according to similarity of said combinations to the idealised star configuration, and prioritising based on said weighting values.

In some examples, the method may further comprise selecting a reference node, identifying candidate combinations of the reference node with at least three other nodes within a threshold radius from the reference node, eliminating candidate combinations failing to satisfy filtering criteria, and prioritising from among the remaining candidate combinations.

In some examples, selecting a reference node may comprise selecting the node that is most reported by wireless terminals in the network. In other examples, selecting a reference node may comprise selecting a reference node according to geographic location.

In some examples, the filtering criteria may be based upon time difference bands between the reference node and each of the other nodes in the combination, wherein a time difference band between two nodes is defined by representative maximum and minimum reported time differences between arrival at a wireless terminal of transmissions from the two nodes. In one example, the representative maximum and minimum reported time differences may be the absolute maximum and minimum reported time differences. In another example, the representative maximum and minimum reported time differences may be based upon a percentile scale. For example, the representative maximum reported time difference may be the $95^{th}$ percentile reported time difference, i.e. the time difference value below which 95% of all reported time difference values may be found. The representative minimum reported time difference may be the $5^{th}$ percentile reported time difference, i.e. the time difference value below which 5% of all reported time difference values may be found.

In some examples, the filtering criteria comprise at least one of a minimum number of reports within at least one of the time difference bands of the combination, a maximum size for any one of the time difference bands of the combination, a minimum threshold for evenness of distribution of reports within at least one of the time difference bands of the combination.

In some examples, the filtering criteria discussed above may also be used as part of the process of weighting combinations of at least four nodes discussed above. For example, in addition to weighting combinations according to similarity of the combinations to the idealised star configuration, combinations may also be weighted according to how well or completely they satisfy the filtering criteria.

According to another aspect of the present invention, there is provided a method for locating a plurality of wireless terminals in a communications network, the network comprising a plurality of network nodes at known locations, wherein the nodes emit wireless transmissions in an unsynchronised manner, such that a time difference exists between the emission time of corresponding transmissions from different nodes. The method comprises receiving reports from a plurality of wireless terminals of transmissions received from the network nodes, selecting a subset of network nodes, identifying a plurality of reports reporting transmissions from all of the nodes of the subset, and simultaneously determining the locations of the wireless terminals generating the identified reports and the time differences between emission times of transmissions from the nodes of the subset.

In some examples, the simultaneous determining of locations and time differences may comprise determining only some of the time differences between the nodes of the subset, and may comprise determining only those time differences relative to a single node of the subset which may be a reference node.

In some examples, selecting a subset of nodes may comprise performing a method for identifying according to the first aspect of the present invention.

In some examples, the method may further comprise filtering the reports after receipt by discarding reports that report transmissions from less than 4 sites. This may reduce the number of reports to be considered in the filtering of candidate combinations according to an examples of the method of the first aspect of the present invention.

In some examples, if the subset of nodes contains N nodes, identifying a plurality of reports reporting transmissions from all of the nodes of the subset may comprise identifying a minimum number of n reports, where $n=(N-1)/(N-3)$.

In some examples, simultaneously determining the locations of wireless terminals generating the identified reports and the time differences between emission times of transmissions from the nodes of the subset may comprise identifying a reference node in the subset and, for each identified report and for each pair of nodes in the subset comprising the reference node and another node, representing a difference in reported reception time of transmissions from the two nodes of the pair as the sum of the time required for a wireless signal to travel the difference in distance between the wireless terminal generating the report and the two nodes of the pair, and the difference in emission time of the transmissions from the two nodes of the pair.

In some examples, the method may further comprise selecting a new subset of network nodes and repeating the steps of identifying reports reporting transmissions from all of the nodes of the subset, and simultaneously determining the locations of the wireless terminals generating the identified reports, and time differences between emission times of transmissions from the nodes of the subset, for the new subset of network nodes.

In some examples, the method may further comprise using the determined time differences between emission times of transmissions from the nodes of the subset to calculate time differences between emission times of transmissions from other network nodes. The other nodes may in some examples be within the subset or may be outside the subset. In some examples calculating the time differences between emission times of transmissions from other network nodes may comprise performing linear combinations.

In some examples, the method may further comprise determining locations of other wireless terminals in the network based upon the reports received from the other wireless terminals and the determined time differences between emission times of transmissions from the network nodes.

According to another aspect of the present invention, there is provided a computer program product configured, when run on a computer to carry out a method according to the first or second aspects of the present invention.

According to another aspect of the present invention, there is provided a network element configured for identifying nodes in a communications network for use in locating wireless terminals within the network based upon reports from the wireless terminals of transmissions received from the nodes. The network element comprises an identifying unit configured to prioritise combinations of nodes in which at least three nodes are located around a reference node in a configuration satisfying similarity criteria to an idealised star configuration, wherein an idealised star configuration comprises three nodes evenly angularly distributed around, and at the same distance from, a reference node.

In some examples, the network element may further comprise a reference unit configured to select a reference node, a candidate identifying unit configured to identify candidate combinations of the reference node with at least three other nodes within a threshold radius from the reference node, and a filtering unit configured to eliminate candidate combinations failing to satisfy filtering criteria. The identifying unit may be configured to prioritise from among the remaining candidate combinations.

According to another aspect of the present invention, there is provided a network element configured for locating a plurality of wireless terminals in a communications network, the network comprising a plurality of network nodes at known locations, wherein the nodes emit wireless transmissions in an unsynchronised manner, such that a time difference exists between the emission time of corresponding transmissions from different nodes. The network element comprises a receiving unit configured to receive reports from a plurality of wireless terminals of transmissions received from the network nodes, a node selection unit configured to select a subset of network nodes, a report identifying unit configured to identify a plurality of reports reporting transmissions from all of the nodes of the subset, and a determining unit configured to simultaneously determine the locations of the wireless terminals generating the identified reports and the time differences between emission times of transmissions from the nodes of the subset.

In some examples, the node selection unit of the network element may comprise a network element according to the above aspect of the present invention. The node selection element may thus comprise an identifying unit configured to prioritise combinations of nodes in which at least three nodes are located around a reference node in a configuration satisfying similarity criteria to an idealised star configuration, wherein an idealised star configuration comprises three nodes evenly angularly distributed around, and at the same distance from, a reference node.

According to another aspect of the present invention, there is provided a network element configured for identifying nodes in a communications network for use in locating wireless terminals within the network based upon reports from the wireless terminals of transmissions received from the nodes. The network element comprises a processor and a memory, the memory containing instructions executable by the processor whereby the network element is operative to prioritise combinations of nodes in which at least three nodes are located around a reference node in a configuration satisfying similarity criteria to an idealised star configuration, wherein an idealised star configuration comprises three nodes evenly angularly distributed around, and at the same distance from, a reference node.

In some examples, the network element may be further operative to select a reference node, identify candidate combinations of the reference node with at least three other nodes within a threshold radius of the reference node, eliminate candidate combinations failing to satisfy filtering criteria, and prioritise from among the remaining candidate combinations.

In some examples, the network element may be further operative to apply filtering criteria based upon time difference bands between the reference node and each of the other nodes in the combination, wherein a time difference band between two nodes is defined by the maximum and minimum reported time differences between arrival at a wireless terminal of transmissions from the two nodes.

According to another aspect of the present invention, there is provided a network element configured for locating a plurality of wireless terminals in a communications network, the network comprising a plurality of network nodes at known locations, wherein the nodes emit wireless transmissions in an unsynchronised manner, such that a time difference exists between the emission time of corresponding transmissions from different nodes. The network element comprises a processor and a memory, the memory containing instructions executable by the processor whereby the network element is operative to receive reports from a plurality of wireless terminals of transmissions received from the network nodes, select a subset of network nodes, identify a plurality of reports reporting transmissions from all of the nodes of the subset, and simultaneously determine the locations of the wireless terminals generating the identified reports and the time differences between emission times of transmissions from the nodes of the subset.

In some examples, the network element may be further operative to select a subset of nodes by performing a method for identifying of the first aspect of the present invention.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Aspects of the present invention provide a method for locating a plurality of wireless terminals, such as user equipment devices (UEs), in a communications network. In particular, methods according to the present invention permit the simultaneous determining of locations of a plurality of wireless terminals and relative time differences between nodes in the network. As discussed above, relative time difference refers to the difference in time between emission of corresponding signals from different nodes within a network. Aspects of the present invention also provide a method for identifying nodes in a communications network for use in locating wireless terminals within the network.

Examples of the method for identifying nodes may be used in conjunction with the method for locating wireless terminals, so providing improvements in the efficacy of the method for locating wireless terminals, as discussed in more detail below.

Figure 1:
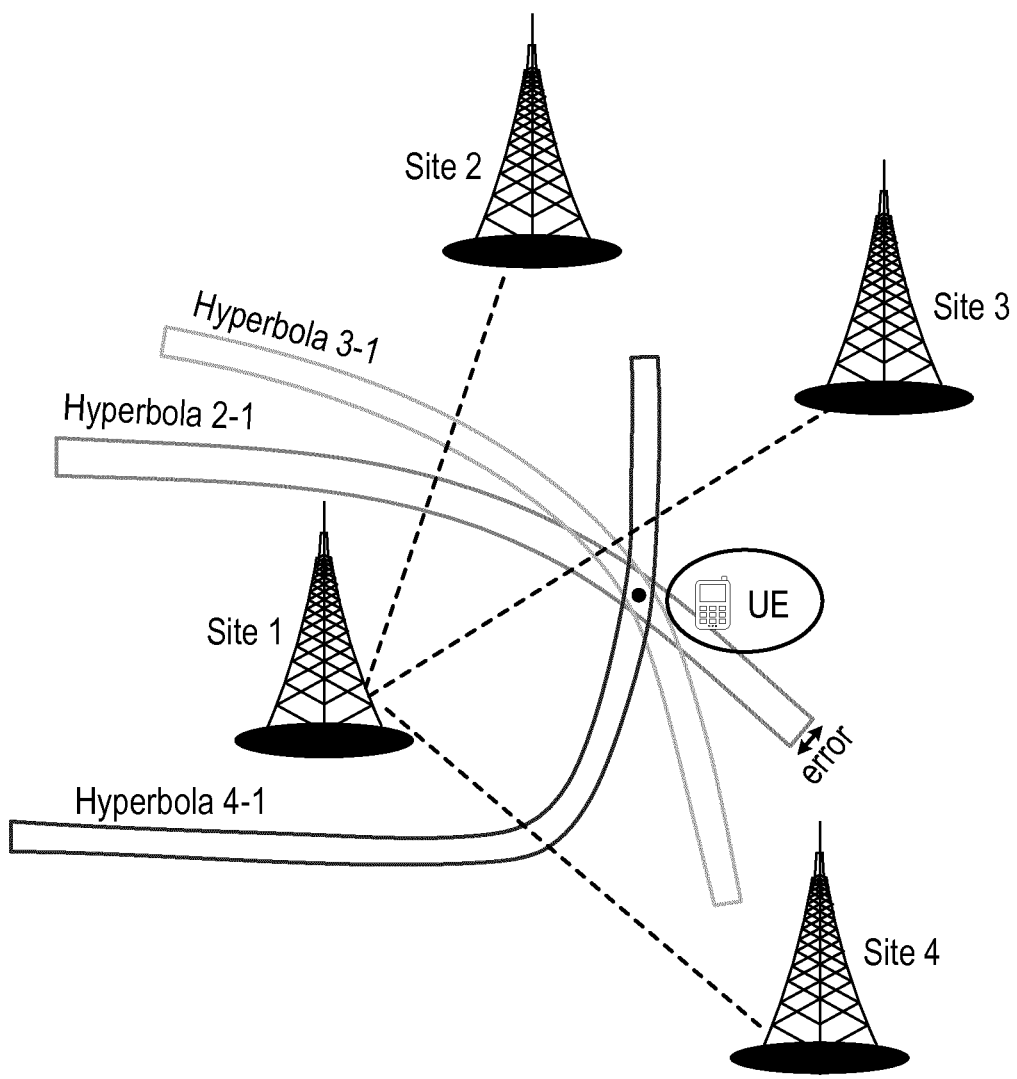
FIG. 1 illustrates a multilateration technique for locating wireless terminals.
Figure 2:
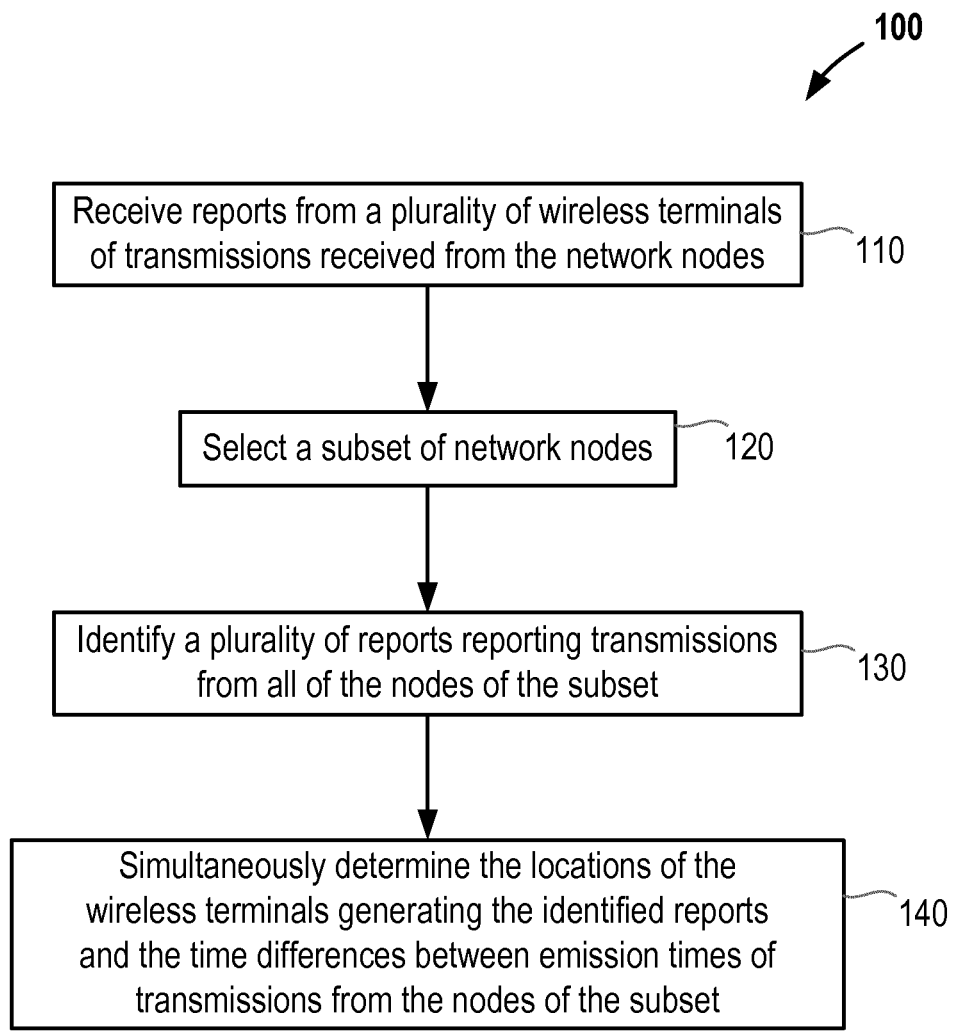
FIG. 2 is a flow chart illustrating process steps in a method for locating wireless terminals in a communications network in one embodiment of the present invention.

FIG. 2 illustrates process steps in a method 100 for locating wireless terminals in a communications network, which network comprises a plurality of network nodes at known locations. The wireless terminals may for example be user equipment devices such as mobile phones or any other kind of wireless terminal. The nodes of the communications network emit wireless transmissions in an unsynchronised manner, that is in which a time difference may be present between corresponding wireless transmissions from different nodes in the network. The network nodes may for example be network basestations forming a part of a radio access network. The method may for example be conducted in an element of the network, which may be a basestation, core network element or any other network element. For the purposes of illustration, the method is described below as taking place within a notional "network element".

In a first step 110 of the method 100, the network element receives reports from a plurality of wireless terminals of transmissions received from network nodes in the network. The received reports may for example be Measurement Reports as defined in 3GPP standardisation documents. The reports include details of transmissions received from network nodes, including arrival times of the transmissions. The arrival times may be presented as simple arrival times, to be translated into arrival time differences by the network element, or the report may present the transmissions in the form of arrival time difference between signals from two different basestations.

In a second step 120, the network element selects a subset of nodes. The network element then identifies, in step 130, a plurality of reports reporting transmissions from all of the nodes of the subset. Finally, in step 140, the network element simultaneously determines the locations of the wireless terminals generating the reports that were identified in step 130, and time differences between emission times of transmissions from the nodes of the subset.

Figure 3:
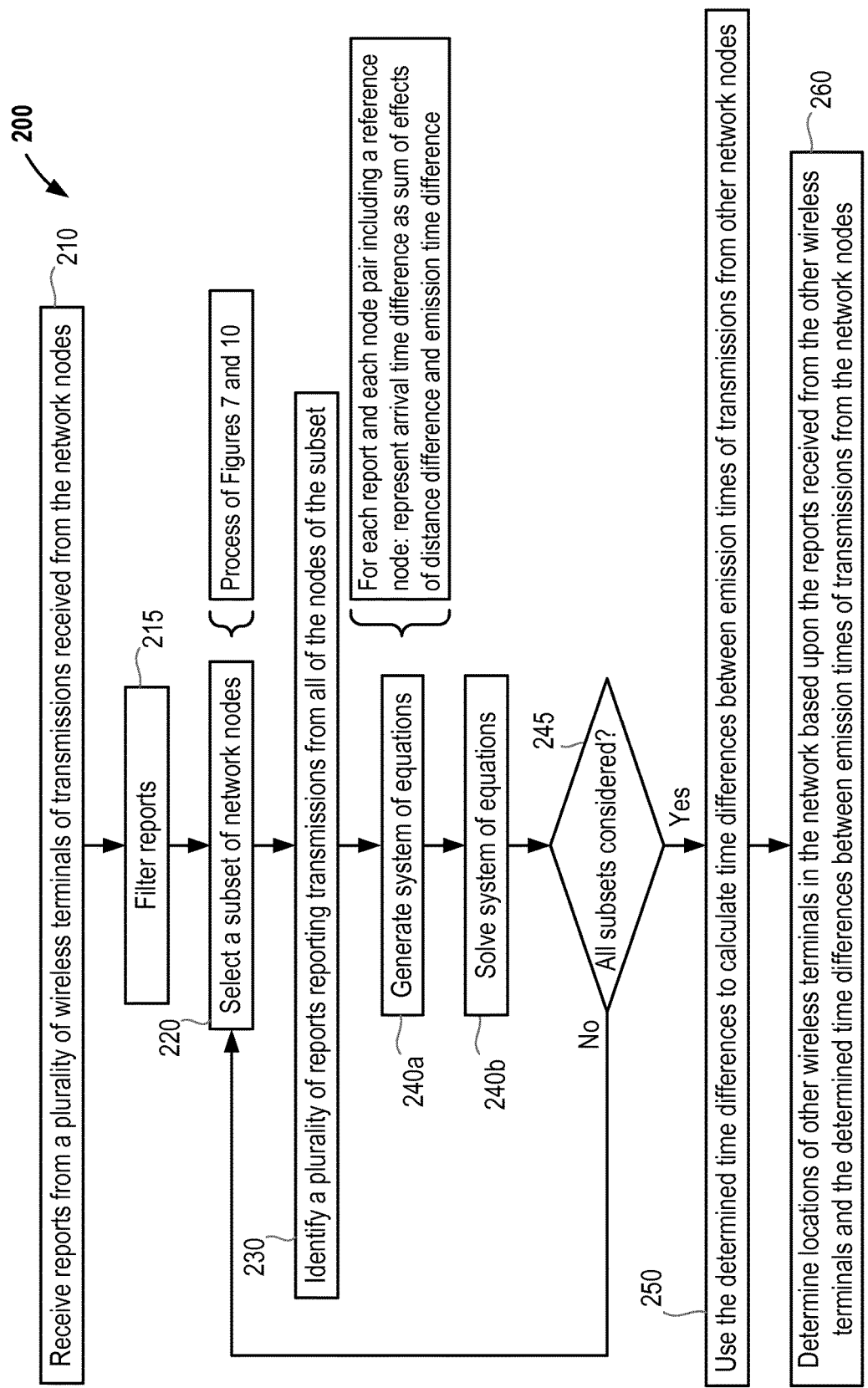
FIG. 3 is a flow chart illustrating another embodiment of method for locating wireless terminals in a communications network.

FIG. 3 illustrates another example method 200 comprising additional steps and sub steps which may be included in the method 100 in order to realise the effects of the method 100 of FIG. 2. The method 200 of FIG. 3 is also described as taking place within a notional network element, which may be a dedicated network element or may be located within another network element such as a basestation.

Referring to FIG. 3, in a first step 210, the network element receives reports from a plurality of wireless terminals of transmissions received from network nodes in the network. The reports may include time difference of arrival of wireless transmissions from different network nodes, or may include merely time of arrival information for the different transmissions. This time of arrival information may be converted into time difference of arrival information in the network element in an additional sub step (not illustrated). The reports may be received at the network element directly from the wireless devices, or in another example, may be received from the network nodes. For example, each wireless terminal may report directly to a particular network node, and the network nodes may assemble reports from all their connected wireless terminals and forward these to the network element for consideration. Thus the step of assembling times of arrival into time differences of arrival may be conducted in the wireless terminals, in the network nodes or in the network element. In order to ensure a maximum of information is available for locating purposes, it is desirable to receive as many reports as may be available, and thus if being reported by the network nodes, each node may be required to provide a minimum number of reports.

In a second step 215, the network element conducts filtering of the received reports, retaining only those reports reporting signals from a minimum number of network nodes. As discussed in further detail below, the filtering stage may retain only those reports reporting signals from a minimum of four network nodes. It will be appreciated that a higher number of reported network nodes will be experienced in soft-handover areas of a communications network than in other areas. Thus wireless terminals located in soft-handover areas may be preferentially located according to the present example method. However, as discussed in further detail below, once the initial method steps are completed, and relative time differences have been determined for network nodes, other locating methods may be used to locate wireless terminals in other areas of the network, where signals from less than four network nodes may be reported.

In addition to discarding those reports reporting less than the minimum number of network nodes, the filtering step 215 may also impose additional filtering criteria related for example to identifying and excluding reports showing evidence of incorrect scrambling code assignments, multipath environments or anomalies related to handover effects.

After filtering the received reports at step 215, the network element then proceeds to select a subset of network nodes in step 220. The process for selecting a subset of network nodes may vary according to different examples of the method. In one example, selecting a subset of network nodes may comprise conducting a process for identifying network nodes as discussed below with reference to FIGS. 7 and 10. For reasons discussed below with reference to steps 240a and 240b, the subset comprises a minimum of four network nodes.

Having selected a subset of network nodes, the network element then proceeds to identify a plurality of reports at step 230, each identified report reporting transmissions from each of the network nodes in the selected subset. In subsequent steps, the information from the identified reports is then used to determine both the locations of the wireless terminals to which the reports correspond, and the relative time differences between nodes of the selected subset.

After identifying the reports in step 230, the network element proceeds to simultaneously determine the locations of the wireless terminals corresponding to the reports and the relative time differences. This is achieved by generating, at step 240a, and solving, at step 240b, a system of equations as discussed below with reference to an example 4-node subset illustrated in FIG. 4.

Preferably simultaneously determining the locations of wireless terminals generating the identified reports and the time differences between emission times of transmissions from the nodes of the subset may comprise identifying a reference node in the subset and, for each identified report and for each pair of nodes in the subset comprising the reference node and another node, representing a difference in reported reception time of transmissions from the two nodes of the pair as the sum of the time required for a wireless signal to travel the difference in distance between the wireless terminal generating the report and the two nodes of the pair, and the difference in emission time of the transmissions from the two nodes of the pair.

Figure 4:
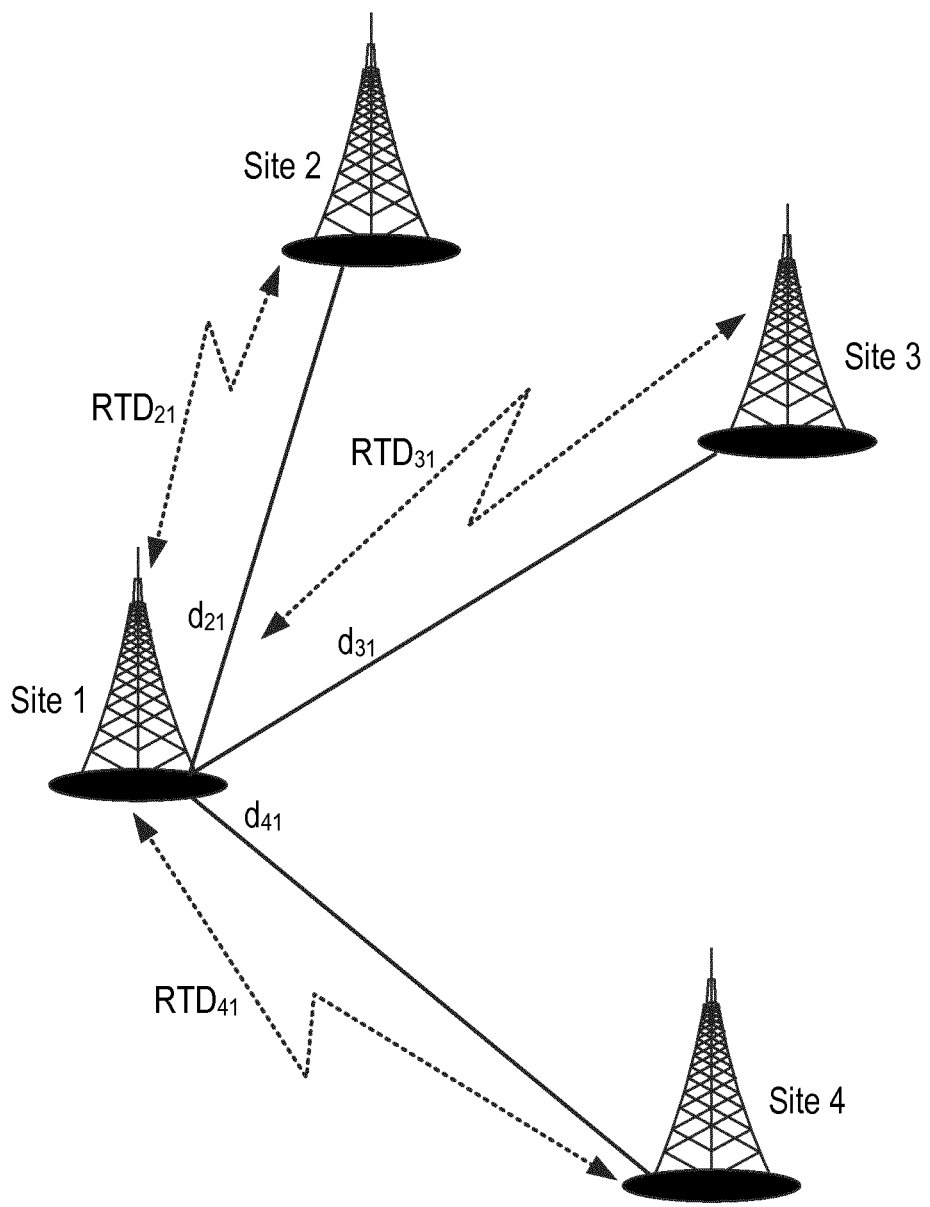
FIG. 4 illustrates parameters which may be used as part of the process of FIG. 3.

FIG. 4 illustrates an example subset comprising four nodes, or sites, in which node number 1 is considered to be a reference node, with relative measurements being made with reference to this node. As illustrated in FIG. 4, a relative time difference RTD exists between transmissions sent from each pair of nodes including the reference node. Each node is also at a different distance from each wireless terminal. The difference in distance between a wireless terminal and a node A and the wireless terminal and a node B is represented as $d_{AB}$.

The equation set of step 240a is generated by considering each measurement report in turn, and for each measurement report, considering each pair of nodes in the subset that may be formed including the reference node. For each pair of nodes, the difference in arrival time at the wireless terminal of the report is represented as the sum of the effects caused by the difference in distance between the wireless terminal and the two nodes, and the difference in the time at which the two signals were sent from the two nodes. Mathematically these two effects may be represented as:

$$T_{R1}[2,1] = \rho \cdot d_1[1,2] + RTD[2,1]$$

Where $T_{R1}[2,1]$ is the time difference between arrival at the wireless terminal of report 1 of transmissions from node 2 and node 1, $d_1[1,2]$ is the difference in distance between the wireless terminal and nodes 1 and 2, and $RTD[2,1]$ is the relative dime difference between nodes 2 and 1 (i.e. the difference in time of emission of transmissions from nodes 2 and 1. T and RTD are measured in units of time, and the element $\rho$ is a constant used to convert the distance difference d into units of time. In a typical scenario in a UMTS network, T and RTD may be measured in chips, where a frame of 10 ms comprises 38400 chips. d may be measured in meters and hence $\rho$ may convert meters into chips. The equation element $\rho \cdot d_1[1,2]$ thus represents the time taken for a wireless transmission to travel the difference in distance between the nodes 1 and 2 and the wireless terminal.

By considering each measurement report and node pair in turn, the following set of equations may be generated for a node subset comprising N nodes and for n identified reports:

Equation set (1)

$$\begin{cases} T_{R1}[2, 1] = \rho \cdot d_1[1, 2] + RTD[2, 1] \\ T_{R1}[3, 1] = \rho \cdot d_1[1, 3] + RTD[3, 1] \\ \vdots \\ T_{R1}[N, 1] = \rho \cdot d_1[1, N] + RTD[N, 1] \end{cases}$$

$$\begin{cases} T_{R2}[2, 1] = \rho \cdot d_2[1, 2] + RTD[2, 1] \\ T_{R2}[3, 1] = \rho \cdot d_2[1, 3] + RTD[3, 1] \\ \vdots \\ T_{R2}[N, 1] = \rho \cdot d_2[1, N] + RTD[N, 1] \end{cases}$$

$$\vdots$$

$$\begin{cases} T_{Rn}[2, 1] = \rho \cdot d_n[1, 2] + RTD[2, 1] \\ T_{Rn}[3, 1] = \rho \cdot d_n[1, 3] + RTD[3, 1] \\ \vdots \\ T_{Rn}[N, 1] = \rho \cdot d_n[1, N] + RTD[N, 1] \end{cases}$$

The above non linear equation set may be simultaneously solved for the location coordinates of the wireless terminals originating the reports and the RTDs between the nodes in step 240b. Any suitable algebraic method for solving the equations may be used, including for example Gauss-Newton, Steepest Descent or Levenberg-Marquardt. Conceptually, each equation represents a hyperbola, with its foci at the two nodes, along which the wireless terminal of the report may be located. The intersection of several hyperbolae concerning the wireless terminal represents the location of the wireless terminal. In a difference from known methods, the RTDs in the system are also unknowns, and hence a greater number of equations is required to allow simultaneous solution for both locations and RTDs.

Equation system 1, relating to N nodes and n reports includes a total of 2n+(N−1) unknowns. The 2n unknowns are the x and y coordinates of the locations of each of the n wireless terminals corresponding to the n reports. The (N−1) unknowns are the RTDs between the N nodes. The total number of equations in the system is n(N−1), given that for each report n, a total of N−1 equations may be generated. In order to solve for all the unknowns simultaneously, the number of equations should be at least equal to the number of unknowns, and thus to allow simultaneous solution for n reports and N nodes, 2n+(N−1) should equal n(N−1). This expression may be simplified to represent a minimum number of reports n of:

$$n=(N-1)/(N-3) \qquad \text{Equation (2)}$$

This equation also indicates that the minimum number of sites N in a subset should be 4, thus allowing simultaneous solution.

The above discussion illustrates the reasoning behind selecting a subset of nodes including a minimum of 4 nodes at step 220. It will also be appreciated that having selected the subset, and when identifying a plurality of reports reporting all of the nodes in the subset at step 230, a number of reports n=(N−1)/(N−3) should be identified. This represents a minimum number of reports to allow for the simultaneous solution for locations and RTDs.

In a preferred embodiment the method may further comprise selecting a new subset of network nodes and repeating the steps of identifying reports reporting transmissions from all of the nodes of the subset, and simultaneously determining the locations of the wireless terminals generating the identified reports, and time differences between emission times of transmissions from the nodes of the subset, for the new subset of network nodes.

Referring again to FIG. 3, following the solution of the system of equations, and hence the obtaining of the wireless terminal locations and the RTDs, the network element proceeds to check, in step 245, whether all possible subsets have been considered. If not all subsets have been considered, the network element returns to step 220 to select a new subset and repeat the steps of identifying reports, generating equations and solving for wireless terminal locations and RTDs. In this manner a maximum of RTDs of different nodes in the network may be determined simultaneously with locating associated wireless terminals.

Once all of the possible subsets have been considered, the network element proceeds, at step 250 to use the determined time differences to calculate time differences between emission times of transmissions from other network nodes. In one example, through a process of linear combination using the determined RTDs, RTDs of other node pairs may be assembled. In this manner, the synchronisation of the network may effectively be recovered, with the RTDs between nodes in the network being known.

Having calculated the RDTs for network nodes including in one example the members of all the subsets considered, and possibility additional nodes as discussed above, the network node may then proceed, at step 260, to determine the locations of other wireless terminals in the network, based upon reports received from those terminals and the calculated or determined RTDs. In this manner, once the synchronisation of the network has been recovered by obtaining the RTDs, the method may take advantage of known techniques for locating wireless terminals in a synchronised network, or when the RTDs in an asynchronous network are known (for example the OTDOA technique discussed in the background section where RTDs are known from network LMUs). The network element may start with wireless terminals reporting transmissions from three sites. With the number of unknowns in the equation set reduced to only the x and y coordinates of the wireless terminal, for a single wireless terminal, a minimum of three sites may be sufficient to locate the terminal using known OTDOA methods.

In a variation of the above described method, additional redundancy may be added to the equation set used to solve for wireless terminal locations and RTDs. In one example, redundancy may be introduced by including within the equation set equations generated for events reporting transmissions from N−1 of the N nodes in the subset, on the condition that the N−1 nodes include the reference node. Thus, in a subset comprising nodes A (reference node), B, C and D, redundancy may be added to the equation set by including reports reporting nodes A, B and C, or A, C and D, or A, B and D. The new equations associated to these new reports form an underdetermined system (with fewer equations than unknowns). However, combined with the equation set generated from reports reporting all nodes of the subset, the additional equations may increase the accuracy of the solution obtained through the original equation set.

Within the subsystem of equations generated from reports reporting N−1 nodes, the RTDs may be considered as unknowns or, for example in an iterative method, may be considered as known, either by using an estimate for the RTDs or using the RTDs as determined from the original equation set.

The new subset of equations may be written as follows, using the same nomenclature as for Equation set (1) above, For a number $n_1$ of reports reporting nodes A, B, C:

$$\begin{cases} T_{R(n+1)}[2,1] = \rho \cdot d_{(n+1)}[1,2] + RTD[2,1] \\ T_{R(n+1)}[3,1] = \rho \cdot d_{(n+1)}[1,3] + RTD[3,1] \\ \vdots \\ T_{R(n+1)}[N-1,1] = \rho \cdot d_{(n+1)}[1,N-1] + RTD[N-1,1] \end{cases}$$

$$\vdots$$

$$\begin{cases} T_{R(n+n1)}[2,1] = \rho \cdot d_{(n+n1)}[1,2] + RTD[2,1] \\ T_{R(n+n1)}[3,1] = \rho \cdot d_{(n+n1)}[1,3] + RTD[3,1] \\ \vdots \\ T_{R(n+n1)}[N-1,1] = \rho \cdot d_{(n+n1)}[1,N-1] + RTD[N-1,1] \end{cases}$$

Equation subset (3a)

Equivalent equation subsets may be assembled for a number $n_2$ of reports reporting nodes A, B, D and for a number $n_3$ of reports reporting nodes A, C, D. These additional equation subsets are referred to collectively as Equation set (3).

Figure 5:
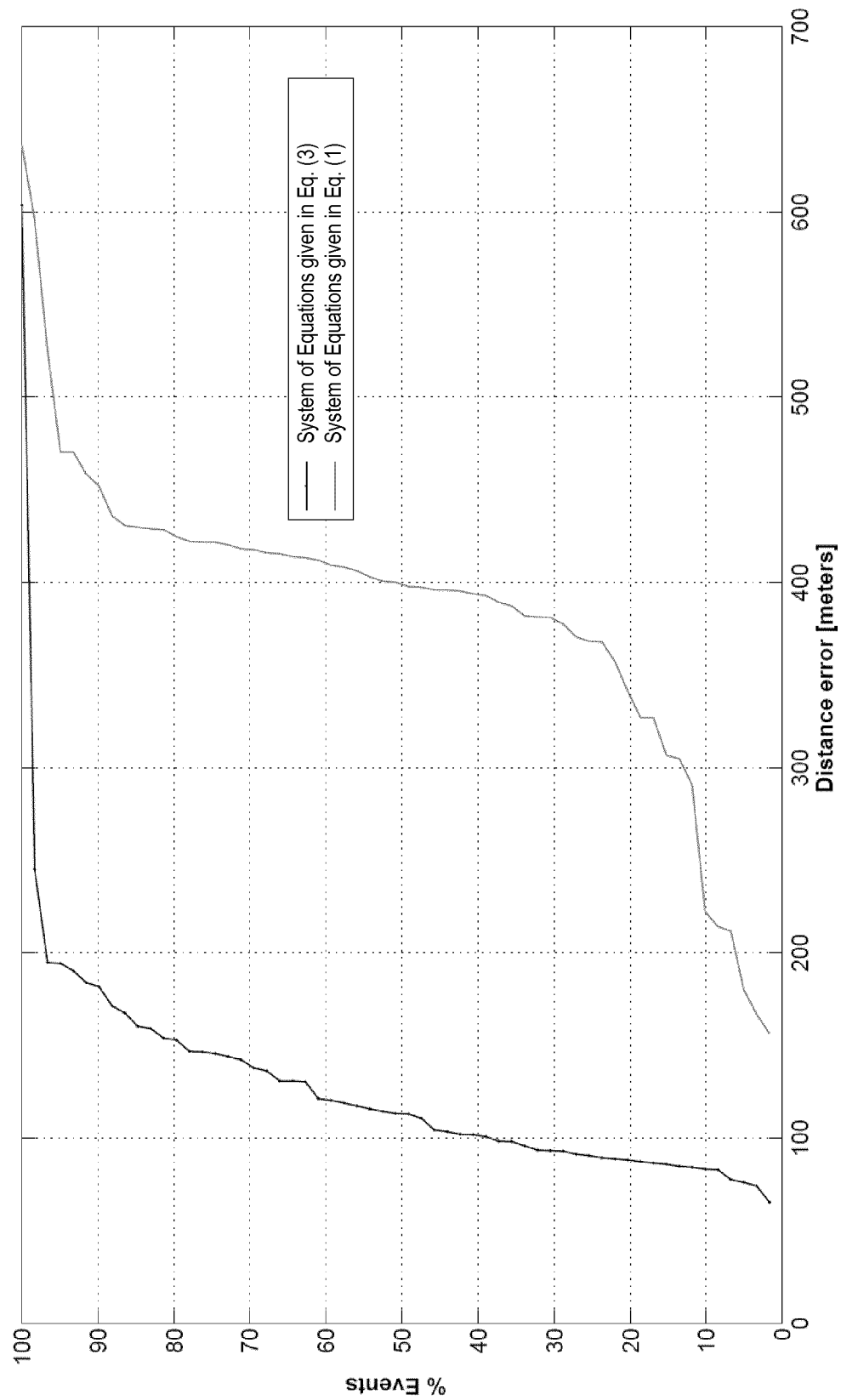
FIG. 5 is a graph comparing results of different embodiments of methods for locating wireless terminals in a communications network.

FIG. 5 illustrates the results of a method according to FIG. 3 using only the Equation set (1), and a method according to FIG. 3 using Equation sets (1) and (3). It can be seen from FIG. 5 that the distance error in locating wireless terminals is considerably reduced by using the additional equation set, and hence adding redundancy into the system of equations.

Figure 6:
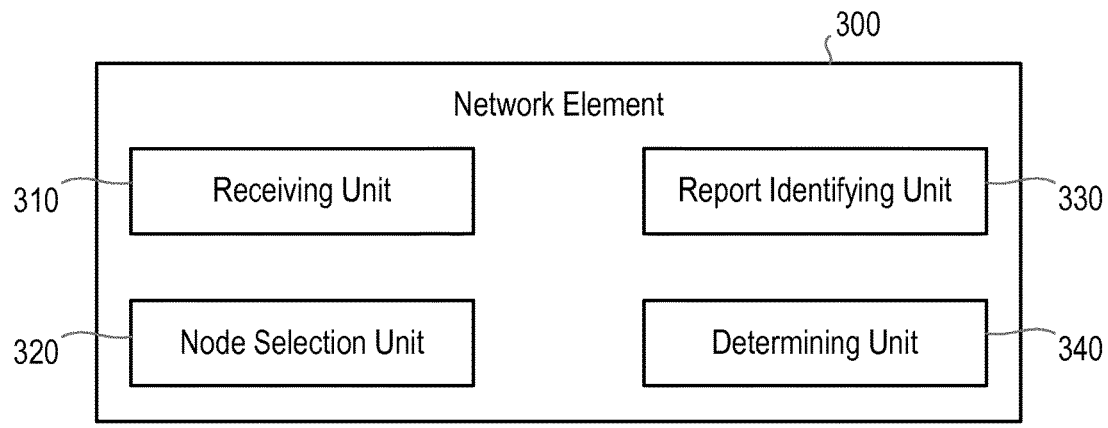
FIG. 6 is a block diagram illustrating functional units in a network element in one embodiment of the present invention.

As discussed above, the example methods of FIGS. 2 and 3 may be conducted by a network element. Apparatus for conducting the methods described above, for example on receipt of suitable computer readable instructions, may be incorporated within a network element such as a basestation, core network element or any other suitable network element. FIG. 6 illustrates functional units in a network element 300 configured for locating a plurality of wireless terminals in a communications network, the network comprising a plurality of network nodes at known locations, wherein the nodes emit wireless transmissions in an unsynchronised manner, such that a time difference exists between the emission time of corresponding transmissions from different nodes. In other words, the network element 300 may execute the steps of the methods of FIGS. 2 and 3, for example according to computer readable instructions received from a computer program. It will be understood that the units illustrated in FIG. 6 are functional units, and may be realised in any appropriate combination of hardware and/or software.

With reference to FIG. 6, the network element 300 comprises a receiving unit 310, a node selection unit 320, a report identifying unit 330 and a determining unit 340. The receiving unit 310 is configured to receive reports from a plurality of wireless terminals of transmissions received from the network nodes. The node selection unit 320 is configured to select a subset of network nodes. The report identifying unit is configured to identify a plurality of reports reporting transmissions from all of the nodes of the subset. The determining unit 340 is configured to simultaneously determine the locations of the wireless terminals generating the identified reports and the time differences between emission times of transmissions from the nodes of the subset.

Preferably the node selection unit 320 of the network element 300 comprises a network element 700 illustrated in FIG. 17 and described in the following parts of this disclosure.

Figure 7:
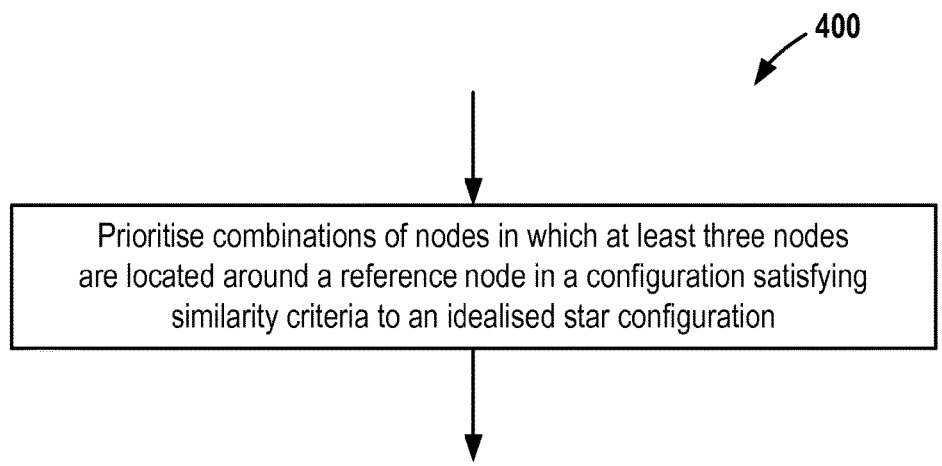
FIG. 7 is a flow chart process steps in a method for identifying nodes in a communications network for use in locating wireless terminals within the network in one embodiment of the present invention.

FIG. 7 illustrates a method 400 for identifying nodes in a communications network for use in locating wireless terminals within the network based upon reports from the wireless terminals of transmissions received from the nodes. The method of FIG. 7 may be used in conjunction with the example methods for locating wireless terminals described above, for example as part of the step 120, 220 of selecting a subset of nodes. Alternatively, the method 400 of FIG. 7 may be used in conjunction with other processes for location of wireless terminals within a network. The nodes may for example be basestations within a communications network.

With reference to FIG. 7, the method 400 comprises prioritising combinations of nodes in which at least three nodes are located around a reference node in a configuration satisfying similarity criteria to an idealised star configuration. The present inventors have found configurations of nodes resembling an idealised star configuration to be robust against the formation of local minima when solving for the location of wireless terminals within the network based on reports from the wireless terminals of transmissions received from the nodes of the configuration.

Figure 8:
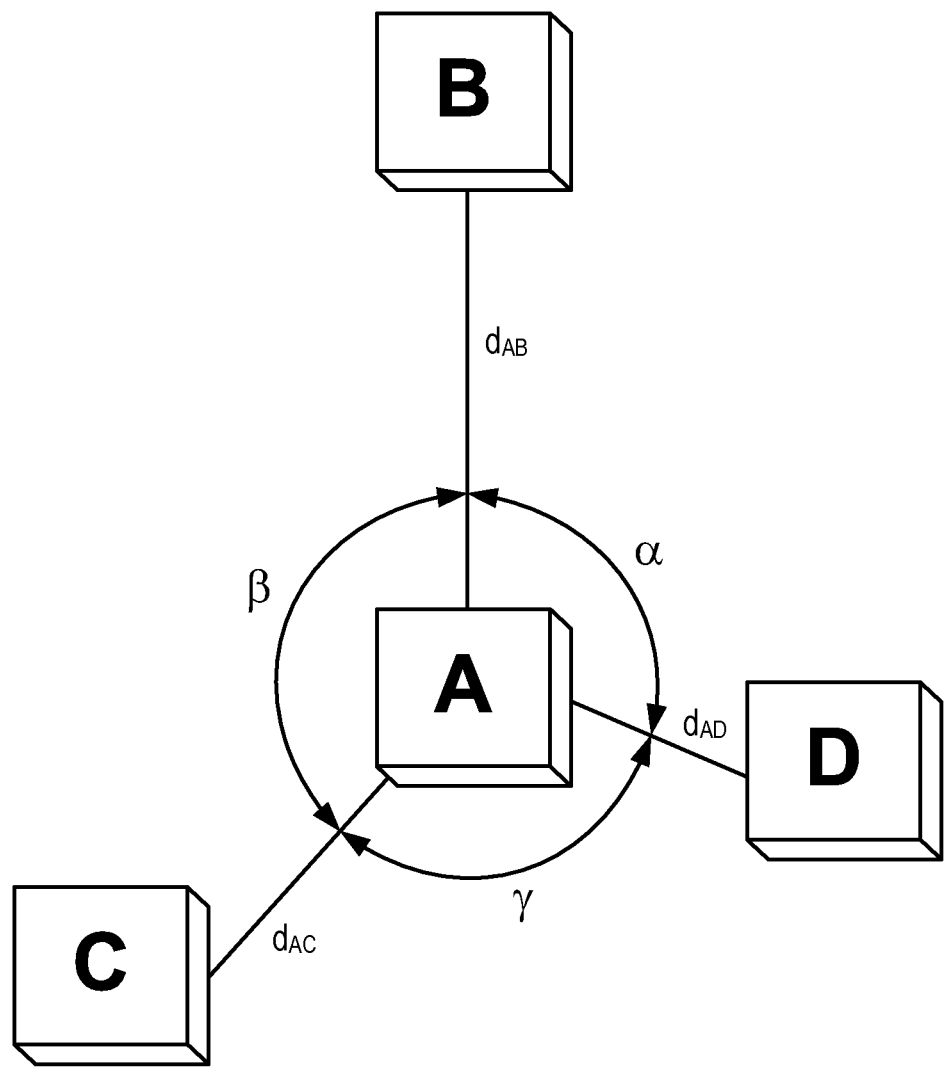
FIG. 8 is a representation of a star configuration of nodes.

A configuration similar to an idealised star configuration is illustrated in FIG. 8. Three nodes B, C and D are arranged around a reference node A. In an idealised star configuration, the three nodes B, C, D are evenly angularly distributed around the reference node A, and thus the angles α, β and γ between the nodes B, C and D are all equal to 120°. In an idealised star configuration, the distances $d_{AB}$, $d_{AD}$ and $d_{AC}$ between the reference node and the three surrounding nodes would be equal. Preferably the distances $d_{AB}$, $d_{AD}$ and $d_{AC}$ are above a minimum threshold and even more preferably they are between the minimum threshold and a maximum threshold. In the illustrated configuration of FIG. 6 the distances are not equal, with $d_{AD}$ being the shortest and $d_{AB}$ being the longest. The ratio between the maximum and minimum distance separating a surrounding node from the reference node may be a similarity criterion for assessing combinations of nodes according to the method 400 of FIG. 7, as discussed in further detail below. For the purposes of the following discussion, configurations satisfying similarity criteria to an idealised star configuration are referred to as star configurations.

Figure 9A:
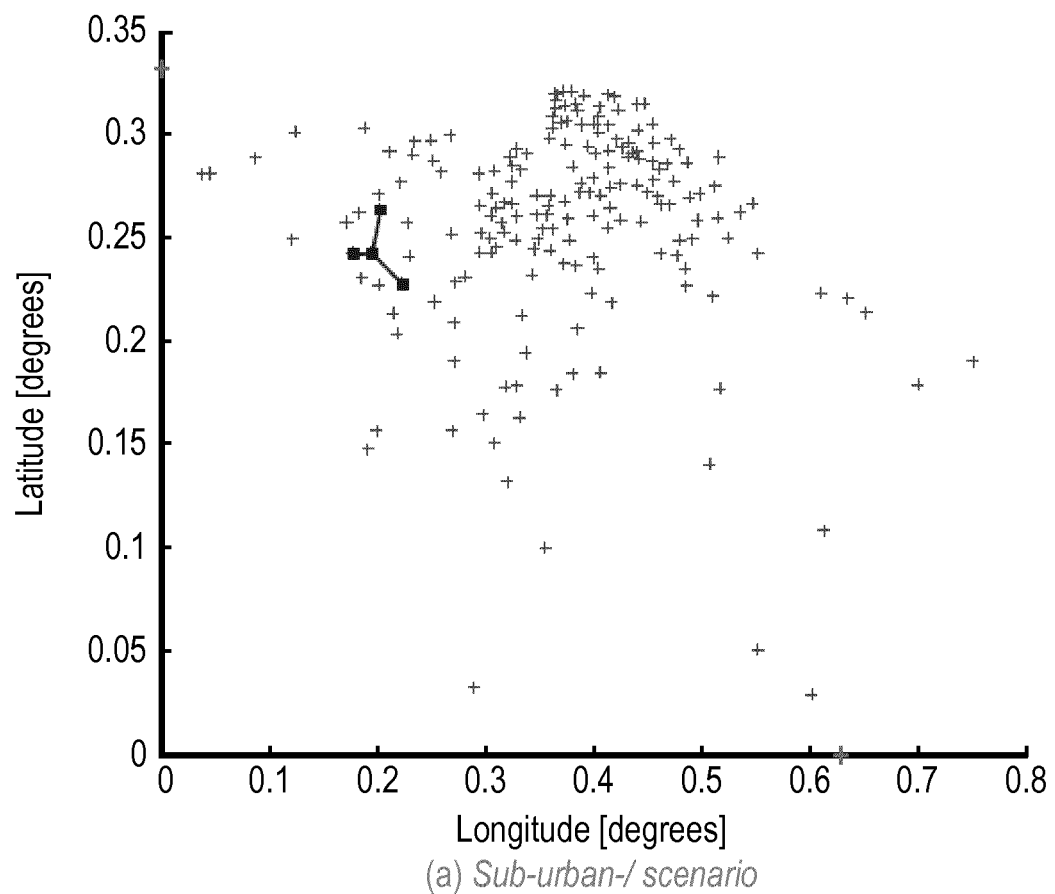
FIGS. 9a to 9c illustrate identified star configurations of nodes in different deployment scenarios in embodiments of the present invention.
Figure 9B:
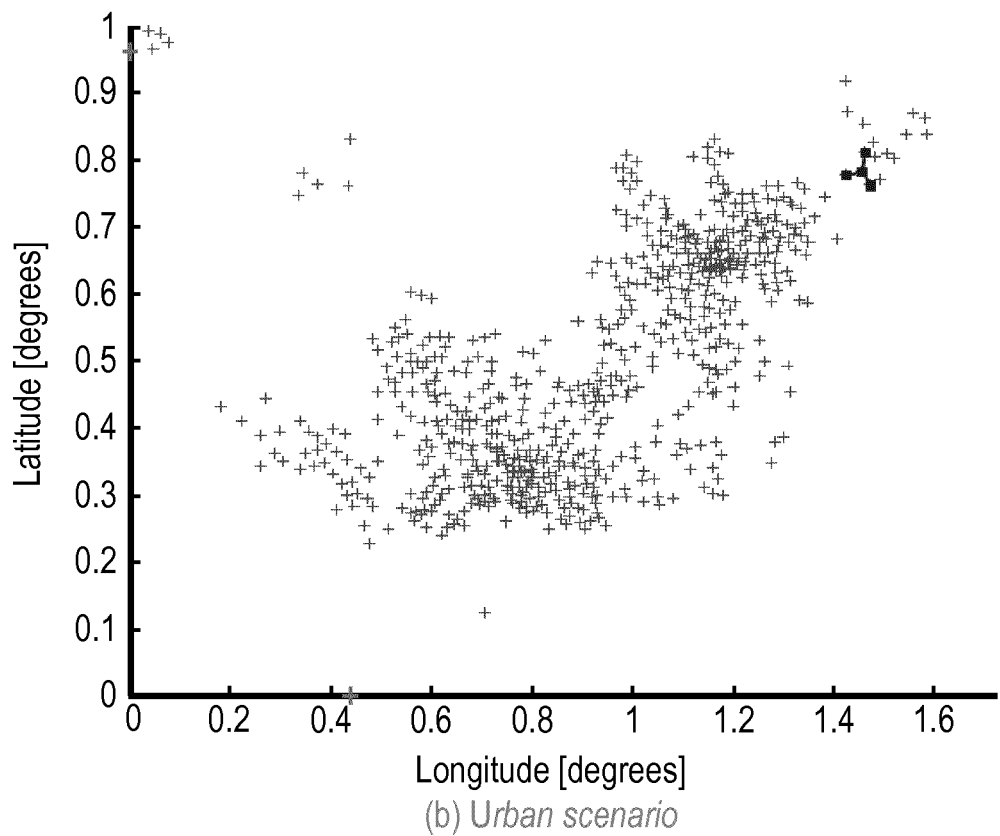
Figure 9C:
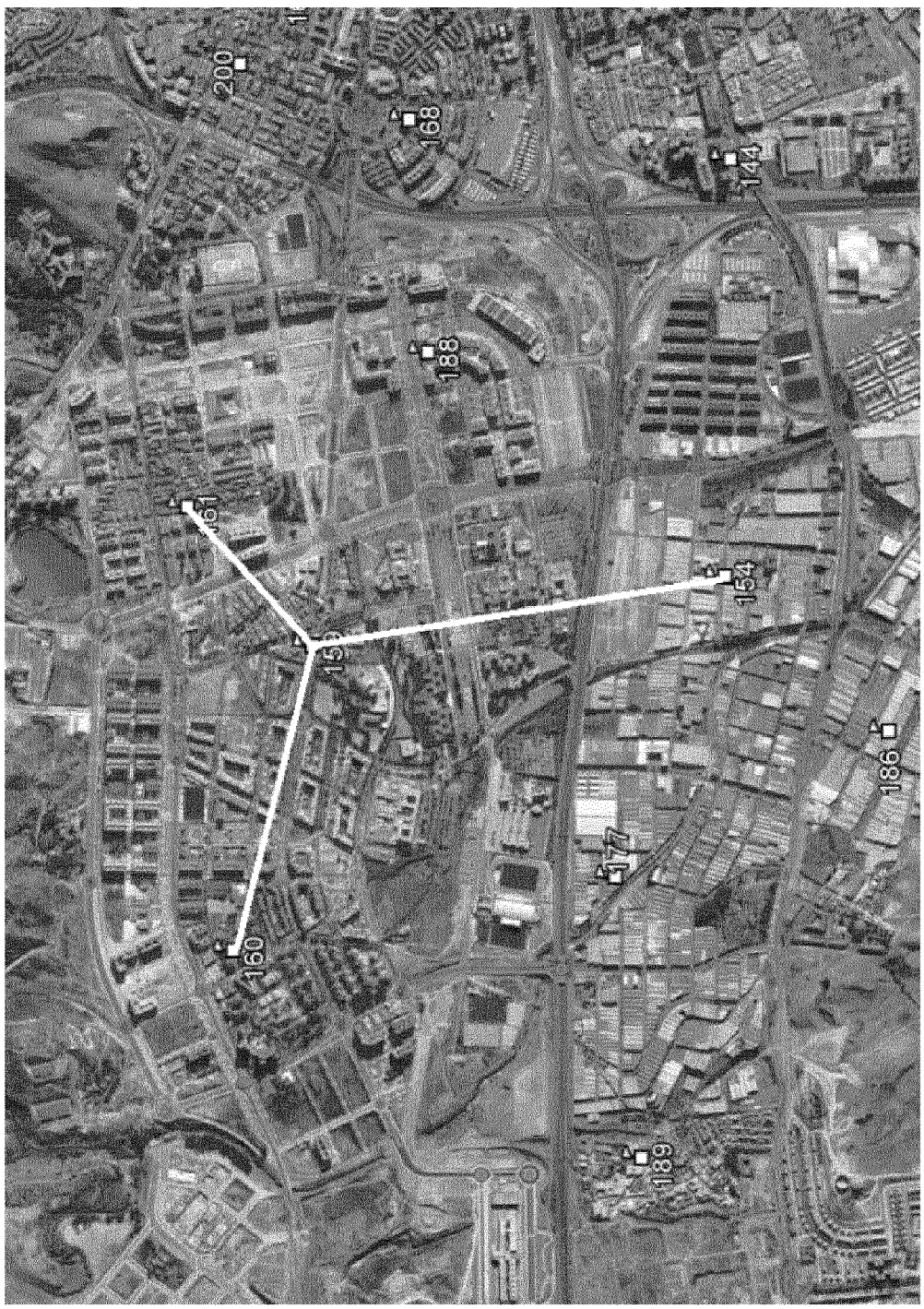

Star configurations occur relatively frequently in existing communications networks, as illustrated in FIGS. 9a to 9c. FIG. 9a is a geographic plot of basestation location in a first sub-urban situation. A representative star configuration is highlighted for illustration, and it will be appreciated that many other examples of a star configuration may be identified within the existing basestations. FIG. 9b is a similar plot of basestation location in an urban area. A much greater density of basestations may be observed, and the illustrated star configuration is merely one of many which may be identified. Finally, FIG. 9c is a larger scale map of a second sub-urban situation, with a scattering of basestations and an example star configuration highlighted.

Figure 10:
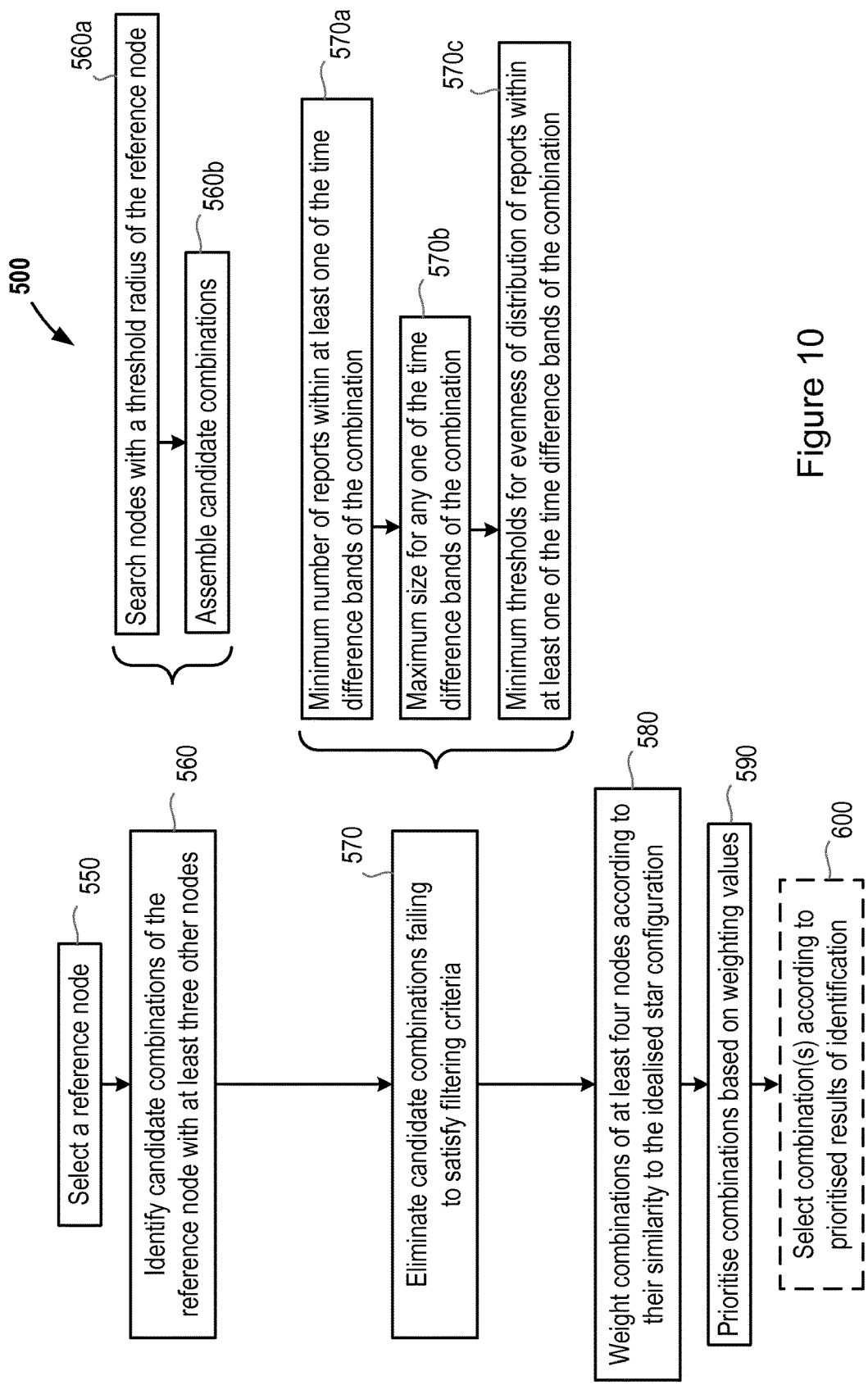
FIG. 10 is a flow chart illustrating another embodiment of method for identifying nodes in a communications network for use in locating wireless terminals within the network.

FIG. 10 illustrates process steps in another method 500 for identifying nodes for use in locating wireless terminals in a network. The method of FIG. 10 illustrates sub steps and optional additional steps which may be conducted in order to achieve the functionality of the method 400 of FIG. 7. Similarly to methods 100, 200 of FIGS. 2 and 3, the method 500 may be conducted by any suitable processing element and may for example be conducted by a network element. The method 500 of FIG. 10 is described below with reference to being conducted by a notional network element, however this is merely for the purposes of illustration. Referring to FIG. 10, in a first step 550, the network element selects a reference node. The reference node may be selected on the basis of any suitable criteria, according to the operational scenario or use case. In one example, if the method 500 is being carried out in conjunction with a method for locating wireless terminals in which reports are received from the wireless terminals, the reference node may be selected to be that node which is most often included in the received reports. In other examples, a reference node may be selected on the basis of geographic location, or of node density within a particular area. In still further examples, a node in a particular handover area may be selected, in order to increase the chance of reports reporting the reference node also reporting transmissions from multiple other nodes. The selected reference node forms the basis of combinations of nodes to be assembled and assessed later in the method, with relative measurements being taken with respect to the reference node.

Having selected a reference node, the network element then proceeds, in step 560, to identify candidate combinations of the reference node with at least three other nodes. The step of identifying candidate combinations may for example comprise searching for nodes within a threshold radius of the selected reference node in step 560A, and then assembling candidate combinations from the nodes located in the search at step 560B. The threshold radius may be defined according to the operational situation, including for example the density of basestations in the area under consideration, the transmitting power of the basestations etc. In an urban area densely populated with basestations, the threshold radius may be considerably smaller than in a less densely populated sub-urban or rural area.

Once the candidate combinations have been identified, a filtering process is conducted, in which the network element eliminates candidate combinations failing to satisfy filtering criteria at step 570 and prioritises from among the remaining candidate combinations. In the present example, three filtering criteria are considered in steps 570A, 570B and 570C, each eliminating combinations less likely to provide useful information for the location of wireless terminals.

At this point, the concept of a time difference band TB is introduced, as this parameter is considered as part of the filtering process of step 570. A time difference band TB is defined for a pair of nodes. In the filtering process of step 570, time difference bands between the reference node and each surrounding node of the candidate combination are considered, however the concept of a time difference band applies to any two nodes. The time difference band is defined based upon reported time differences between arrival times of transmissions from the two nodes at wireless terminals. In a preferred embodiment the filtering criteria are based upon time difference bands between the reference node and each of the other nodes in the combination. A time difference band between two nodes is defined by representative maximum and minimum reported time differences between arrival at a wireless terminal of transmissions from the two nodes. In an example situation in which a plurality of wireless terminals report transmissions received from nodes A and B, the time difference band for nodes A and B, $TB_{A,B}$, is the difference between a representative maximum reported time difference between arrival time at a wireless terminal of transmissions from node A and node B, and a representative minimum reported time difference between arrival time at a wireless terminal of transmissions from node A and node B. In one example, the representative maximum and minimum time differences may be the absolute maximum and minimum reported time differences, i.e. the largest and the smallest reported time differences between arrival times of transmissions from node A and node B. In another example, the representative maximum and minimum reported time differences may be based upon a percentile scale. For example, the representative maximum reported time difference may be the $95^{th}$ percentile reported time difference, i.e. the time difference value below which 95% of all reported time difference values may be found. The representative minimum reported time difference may be the $5^{th}$ percentile reported time difference, i.e. the time difference value below which 5% of all reported time difference values may be found. Using the nomenclature of Equation set (1) above:

$$TB_{A,B} = \text{max reported } T_{Ri}[A,B] - \text{min reported } T_{Ri}[A,B] \quad \text{Equation(4a)}$$

or $$TB_{A,B} = 95^{th} \text{ percentile } T_{Ri}[A,B] - 5^{th} \text{ percentile } T_{Ri}[A,B] \quad \text{Equation (4b)}$$

Where $T_{Ri}[j,k]$ is a reported time difference in the arrival times of transmissions from nodes j and k at wireless terminal i. As noted above with reference to methods 100 and 200, the time difference T between arrival times at a wireless terminal of transmissions from two basestations includes an effect resulting from the relative time difference between the two basestations (i.e. the difference between the emission times of the two transmission) and an effect resulting from the difference in distance between the wireless terminal and the two basestations:

$$T_{Ri}[A,B] = \rho \cdot d_i[A,B] + RTD[B,A] \quad \text{Equation (5)}$$

As noted above, the RTD between two basestations may evolve over time owing to phase drift. However, the timescale for this variation is relatively long compared to a time period over which location analysis might be performed. Thus, for the purposes of an analysis time period, the RTD between two basestations is substantially the same for all wireless terminals reporting transmissions from the two basestations. However, the effect of the distance difference between a wireless terminal and the two basestations may vary according to the location of the wireless terminals. The maximum value of T reported by a wireless terminal for a given basestation pair may thus be the RTD+the time taken for a wireless signal to travel the distance between the two basestations of the pair (the inter node distance). The minimum value of T reported by a wireless terminal for the basestation pair may be the RTD−the time taken for a wireless signal to travel the inter node distance.

Preferably the filtering criteria comprise at least one of a minimum number of reports within at least one of the time difference bands of the combination, a maximum size for any one of the time difference bands of the combination, a minimum threshold for evenness of distribution of reports within at least one of the time difference bands of the combination.

Referring again to FIG. 10, a first filtering criterion which may be considered at step 570A is the number of reports within the time difference bands TB of the combination. For any candidate combination of four nodes, three time difference bands may be calculated with reference to the reference node of the combination. For the example combination of FIG. 8, those time difference bands will be $TB_{A,B}$, $TB_{A,C}$ and $TB_{A,D}$. In step 570A, the network element considers whether at least one of the time difference bands includes a number of reported time differences T which is above a defined minimum number. In the majority of locating processes which may be conducted using the identified site combinations, a greater number of reports reporting the sites under consideration will equate to an increased accuracy of location. Thus candidate combinations whose time difference bands are well filled with reports (meaning the nodes in the combination are reported by many wireless terminals) are more likely to provide good results in a location process. Eliminating candidate combinations in which none of the time difference bands includes at least a minimum number of reports favours the prioritising of combinations having well filled time difference bands, and hence well reported nodes. The occupation of the time difference band may also be considered at this point. The occupation of a time difference band may be considered as the ratio of the actual band size to the theoretical maximum band size. A band having high occupation will include reports having a wide variation in reported time difference, and so is likely to provide useful information for a locating process.

A second filtering criterion which may be considered at step 570B is the size of the time difference bands of the candidate combination. In step 570B, the network element considers whether any of the time difference bands of a candidate combination exceed a maximum size. Excessively large time difference bands may indicate corrupted measurements which will distort subsequent calculations. Even if the measurements are correct, overly large time bands can lead to unwieldy analysis, and so candidate combinations in which a time difference band exceeds a maximum size may be eliminated from consideration. The maximum size may be defined according to the operational situation but in one example the maximum size may be defined as two times the time taken for a wireless transmission to travel the distance between the two nodes of the time difference band.

A third filtering criterion which may be considered at step 570C is the evenness of distribution of reports within time difference bands of a candidate combination. Evenness of distribution of reports within the time difference band is a good indicator of useful information contained within the band, and hence accurate results that may be achieved in a locating process using a combination including the two nodes of the time difference band. A time difference band that is over 50% filled but includes large regions with no reports provides less useful information than a band with a similar level of occupation but more evenly distributed between the maximum and minimum time differences. In order to assess evenness of distribution, a time difference band may be divided into segments, and the presence of a segment in the band having no reports may indicate a band in which reports are not evenly distributed. The size of time difference band segments may be determined according to the operational scenario in which the method is running. If none of the three time difference bands between the reference node of a combination and the surrounding nodes satisfies a condition for evenness of distribution, the candidate combination may be eliminated.

The combined effect of the three filtering criteria discussed above is to eliminate those candidate combinations least likely to provide useful information for a later locating process. Those candidate combinations that remain after the filtering process include combinations in which the time difference bands between the reference node and the surrounding nodes are the most occupied, are reasonably sized and with the most evenly distributed reports.

After the filtering process of step 570, the network element proceeds in step 580 to weight remaining candidate combinations according to their similarity to the idealised star configuration. Similarity may be assessed according to:
  (i) a maximum and minimum separation between the reference node and any one of the surrounding nodes;
  (ii) angular distribution of the surrounding nodes about the reference node; and
  (iii) the ratio of maximum to minimum separation between a surrounding node and the reference node.

Preferably the similarity criteria comprise an angular distribution around the reference node that differs from even angular distribution by less than a maximum amount, and a ratio of maximum to minimum distance from the reference node to any one of the three nodes that is less than a defined maximum ratio.

Each configuration may be assessed according to the amount by which it differs from the idealised star configuration, in which node separation from the reference node is within the maximum and minimum limits, and the surrounding nodes are equally angularly distributed about, and equally distant from, the reference node. In one example, each combination may be individually assessed and assigned an individual weighting factor according to its similarity to the idealised star configuration; the more similar the candidate combination is to the idealised star configuration, the higher the weighting factor. In another example, thresholds may be placed on each criterion, with candidate combinations meeting the thresholds being given a positive weighting factor, and candidate combinations failing to meet the thresholds given a negative weighting factor. In one example, the thresholds may for example include:
  (i) within 20% of the maximum and minimum separations of the idealised star configuration;
  (ii) within 30 degrees of even angular distribution; and
  (iii) a ratio of maximum to minimum distance from the reference node to any one of the three nodes of 4:1.

Preferably the similarity criteria comprise an angular distribution within 20 degrees of even distribution around the reference node and a maximum ratio of maximum to minimum distance from the reference node to any one of the three nodes of 3:1

In another example, a set of thresholds may include:
  (i) within 10% of the maximum and minimum separations of the idealised star configuration;
  (ii) within 20 degrees of even angular distribution; and
  (iii) a ratio of maximum to minimum distance from the reference node to any one of the three nodes of 3:1.

Other combinations of the above similarity thresholds may be envisaged. The practical significance of the similarity criteria above is discussed below with reference to Table 1.

In some examples, weighting of candidate combinations may additionally be based upon the filtering criteria used for the filtering process of step 570. The candidate combinations remaining after the filtering step 570 may satisfy the filtering criteria to greater or lesser extents, and the extent to which each candidate combination fulfils the filtering criteria may be taken into account when weighting the candidate combinations. Those combinations which are the most completely occupied, and having the greatest evenness of distribution in their time difference bands may be given a higher weighting factor.

Once the remaining candidate combinations have been weighted in step 580, the network element prioritises the combinations on the basis of the weighting values in step 590. Prioritising may take different forms according to the nature of the weighting applied and the requirements of a particular use case. In one example, a prioritised list of combinations may be assembled, with the most highly weighted combination at the head of the list. In another example, a pool of combinations having a positive weighting factor, or a weighting factor over a threshold value, may be assembled, with combinations in the pool being prioritised over combinations not in the pool.

Preferably prioritising comprises weighting combinations of at least four nodes according to similarity of said combinations to the idealised star configuration, and prioritising based on said weighting values.

The method 500 thus prioritises combinations of at least four nodes whose configuration is similar to an idealised star configuration. The method thus enables a further process to select a combination or combinations according to the prioritised results of the identifying method 500. This selection is illustrated in FIG. 10 as an optional additional step 600. Selection may take place for example to enable a locating process to be conducted using the most favourable combinations of nodes, which have been identified by the method 500 of FIG. 10.

As discussed above, the method of FIG. 10 may operate in conjunction with a method for locating wireless terminals, such as the methods 100, 200 of FIGS. 2 and 3. In one example of the method 200 of FIG. 3, the step 220 of selecting a subset of network nodes comprises conducting a process as illustrated in FIG. 10, prioritising combinations of nodes whose configuration is similar to an idealised star configuration, and then selecting a subset of nodes from among the prioritised combinations. As noted above, star configurations have been found by the present inventors to be particularly robust to the formation of local minima when solving for location of wireless terminals. Use in the methods of FIG. 2 or 3 of combinations identified according to the methods of FIG. 7 or 10 thus helps to ensure more accurate results when compared with the methods using combinations of nodes in a configuration other than a star configuration.

In one embodiment of the present invention, there is provided a computer program product configured, when run on a computer to carry out the method of identifying nodes in a communications network as well as the method for locating wireless terminals is a communications network.

Table 1 below illustrates how combinations of nodes having a star configuration, that is combinations satisfying similarity criteria to an idealised star configuration, provide improved performance when used in the locating method 200 of FIG. 3. Table 1 represents the results of the locating method 200 used on artificial scenarios with ideal conditions, such that errors in the location results are solely caused by the presence of local minima. For each scenario, 100 instances of the locating method were run, each using 100 reports randomly distributed in the scenario space.

TABLE 1

| Scenario | Ratio of closest to farthest surrounding node | Angular distribution of surrounding nodes | | | % of instances solved with error > 0 |
|---|---|---|---|---|---|
| | | AB | AC | AD | |
| 1 | <3:1 | 120° | 120° | 120° | 0% |
| 2 | <3:1 | 100° | 120° | 140° | 0% |
| 3 | <3:1 | 90° | 117° | 143° | 0% |
| 4 | <3:1 | 74° | 129° | 157° | 19% |
| 5 | 3:1<br>$d_{AB}$ = 1239 m<br>$d_{AC}$ = 576 m<br>$d_{AD}$ = 1645 m | 94° | 138° | 94° | 0% |
| 6 | 3:1<br>$d_{AB}$ = 413 m<br>$d_{AC}$ = 192 m<br>$d_{AD}$ = 549 m | 94° | 138° | 94° | 1% |
| 7 | 4:1<br>$d_{AB}$ = 413 m<br>$d_{AC}$ = 192 m<br>$d_{AD}$ = 745 m | 94° | 138° | 94° | 3% |

Scenario 1 represents a substantially ideal case of even angular distribution and a ratio of separation less than 3:1. In this scenario no tests resulted in an error greater than zero, indicating extreme robustness to the formation of local minima. Scenarios 2 and 3 illustrate how with increasing variation from even angular distribution, an excellent error rate may still be assured, providing the angular separation remains within one of the similarity criteria thresholds defined above. In scenario 4, the angular separation differs from even by more than 30 degrees (the most generous of the similarity thresholds discussed above). It can be seen that in this scenario 19% of test instances resulted in a non zero error. While the method still produced an 81% zero error rate, the results can be seen to be improved when a configuration of nodes respecting the example similarity criteria above is used. Scenarios 5, 6 and 7 have the same angular distribution of nodes (within the most generous of the example similarity criteria above). In scenario 5 a ratio of node separation of precisely 3:1 results in a zero error incidence. However, in scenario 6, which also has a node separation ratio of 3:1, an error rate of 1% is seen. The difference in scenario 6 is that the distances have been reduced, demonstrating the importance of the minimum threshold for node separation. In scenario 7, the ratio of node separation has been increased to 4:1 compared with scenario 6. This increase in separation ratio results in an increase in the error rate to 3%. The results of Table 1 thus illustrate the practical significance of the similarity criteria defined above.

The importance of minimum thresholds for node separation is illustrated in scenario 6 of Table 1 above, and is discussed in further detail below with reference to the example configuration of FIG. 8, comprising nodes A (the reference node), B, C and D. If the distance $d_{AB}$ is particularly small, all hyperbolae constructed between A and B for the possible location of a wireless terminal will be compressed into this small separation. Using a non-linear least squares approach, the cost function to be minimised may be written in the form:

$$\varepsilon(x) = (d - \hat{d}(x))^T (d - \hat{d}(x)) \qquad \text{Equation (6)}$$

where d=[d[A, B], d[A, C], d[A, D], and d[A, i], i∈{B, C, D} is the distance difference between the location corresponding to a report k and the pair of nodes A and i.

$\hat{d}(x)$ is the estimated distance calculated by an iterative algorithm in the estimated position x. Assuming the presence of a local minimum formed by the intersection of the hyperbolae A-C and A-D, if the distance, $d_{AB}$, were relatively small, then the local minimum would have a minor impact in the cost function given by Equation (6) above. The maximum contribution to this cost function would be $d_{AB}^2$, i.e. a wireless terminal placed at one of the nodes (node A, for instance), but with an estimated location at the other node (node B). There would thus be only a slight difference in residual between a local minimum at node B and the global minimum at node A, leading to potential confusion between the local minimum and the global minimum with a positioning algorithm becoming blocked in the local minimum. Imposing a minimum distance between nodes, as well as prioritising nodes having approximately equal separation from the reference node (for example in 3:1 or 4:1 ratio), helps to avoid the formation of local minima as well as reducing the impact of local minima on a solution.

It may also be noted that avoiding very small distances between nodes also helps to minimise the impact of rounding errors for example in timing measurements. Taking the example of a UMTS network, time differences of arrival may be measured with a resolution of 1 chip, and a range of 0 to 38399 chips. A maximum of ±0.5 chips rounding error may thus be including in a time difference measurement. The impact of this rounding error will be reduced by avoiding very small distances between nodes in a configuration, for example by applying the minimum threshold distance between nodes discussed above with reference to the selection criteria for configurations.

The effectiveness of configurations resembling an idealised star configuration has been demonstrated above in a practical manner with reference to the experimental results given in Table 1. The following discussion compares the effectiveness of configurations resembling an idealised star configuration with other configurations by consideration of the slope difference range of hyperbolae used to solve for position on the basis of the different node configurations.

As discussed above, the existence of intersections of two only of three hyperbolae in a system is an important factor in the appearance of local minima. A second factor, directly related to the first factor, is a small slope difference range between hyperbolae. The slope difference range is defined as the difference between the largest and the smallest value of the derivative of y with respect to x, dy/dx, assuming an equation for a hyperbola with semimajor axis a, parallel to the x axis and semiminor axis b, parallel to the y axis. The slope of the line segment tangent to the hyperbola at a point $P=(x_p, y_p)$ is given by:

$$\frac{dy}{dx} = \frac{b^2}{a^2}\frac{(x_p - x_0)}{(y_p - y_0)} \equiv m \qquad \text{Equation (7)}$$

Where the centre of the hyperbola is at the point $(x_0, y_0)$.

Figure 11:
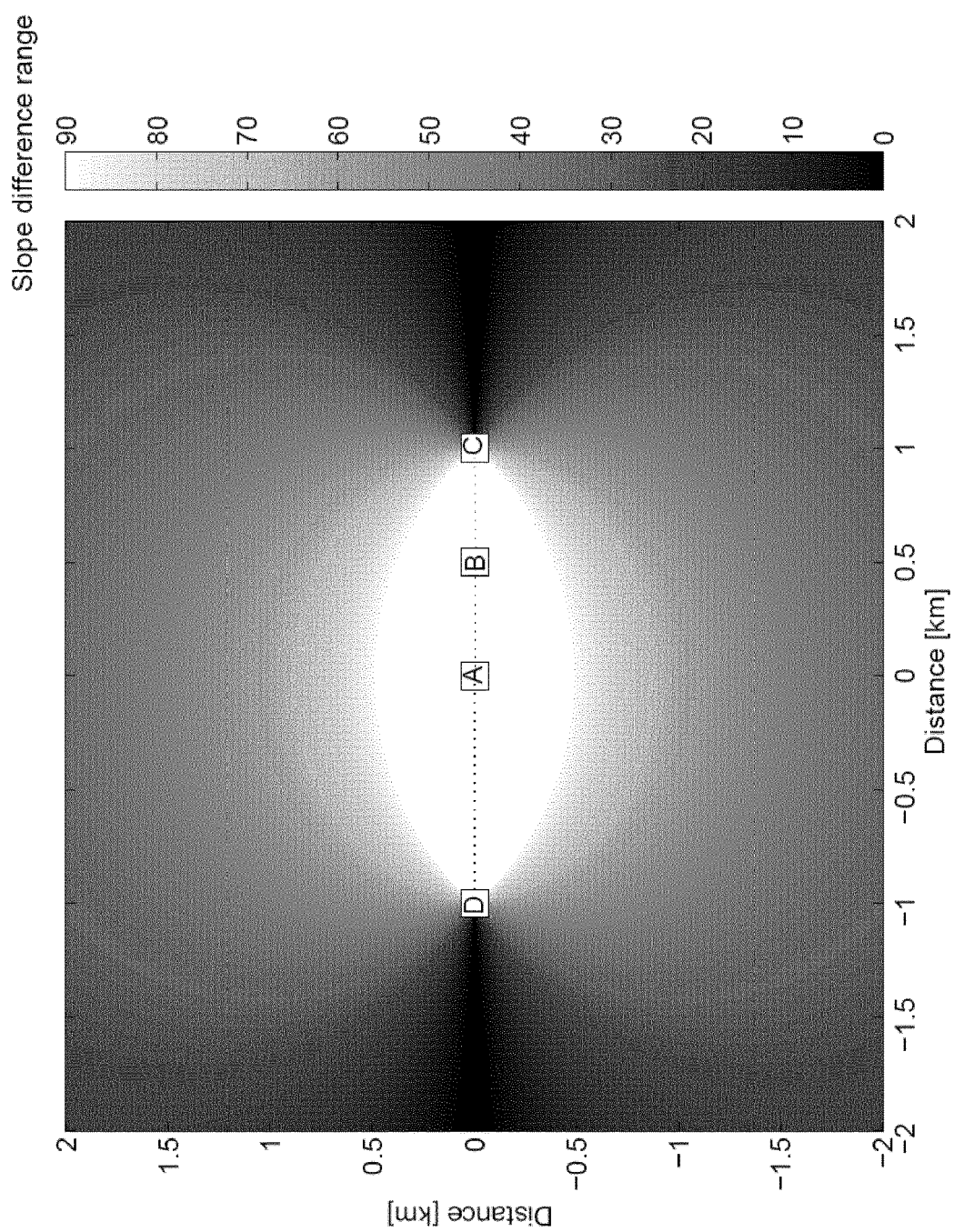
FIGS. 11 to 14 are graphs illustrating the likelihood of local minima in solutions involving different configurations of network nodes.
Figure 12:
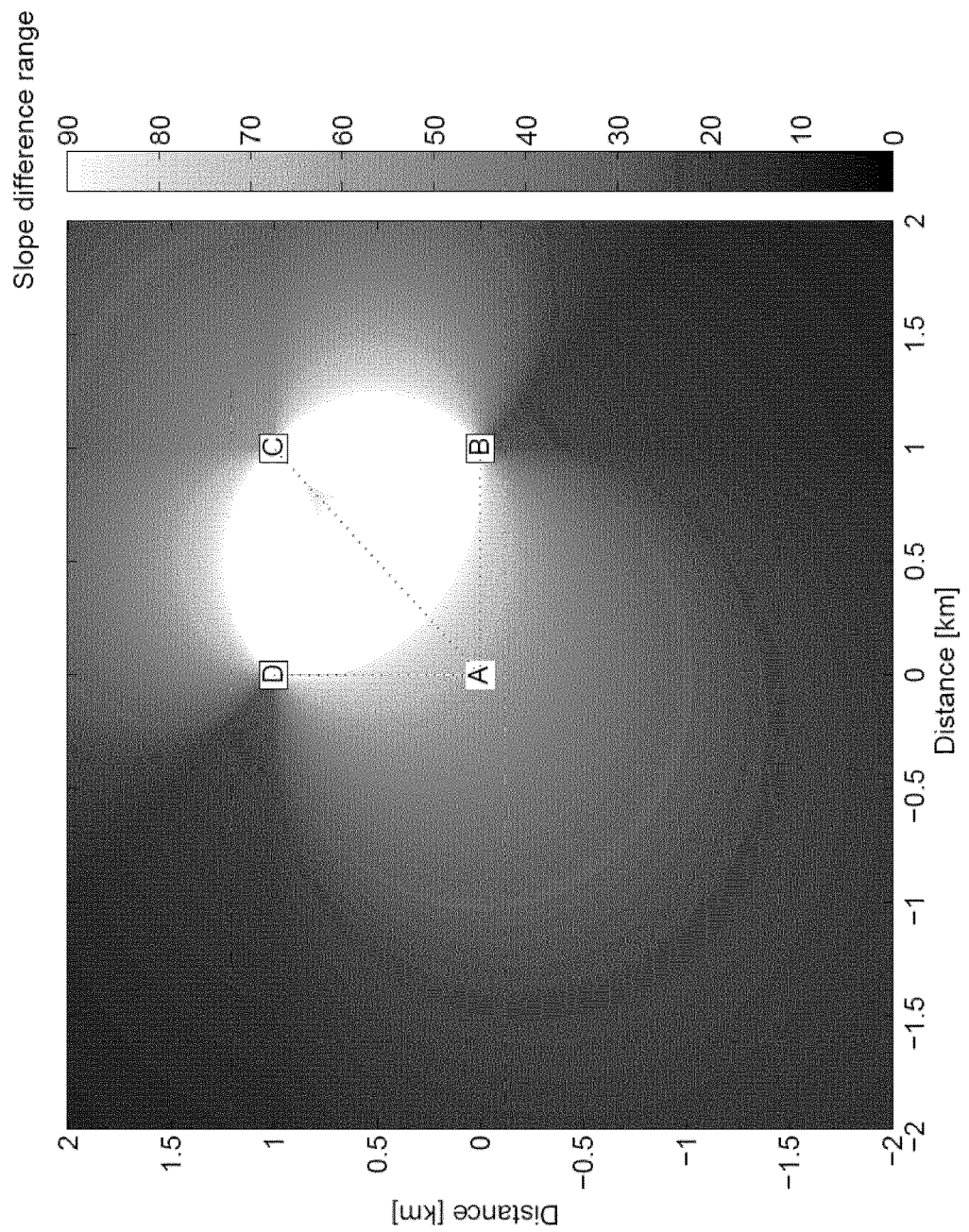
Figure 13:
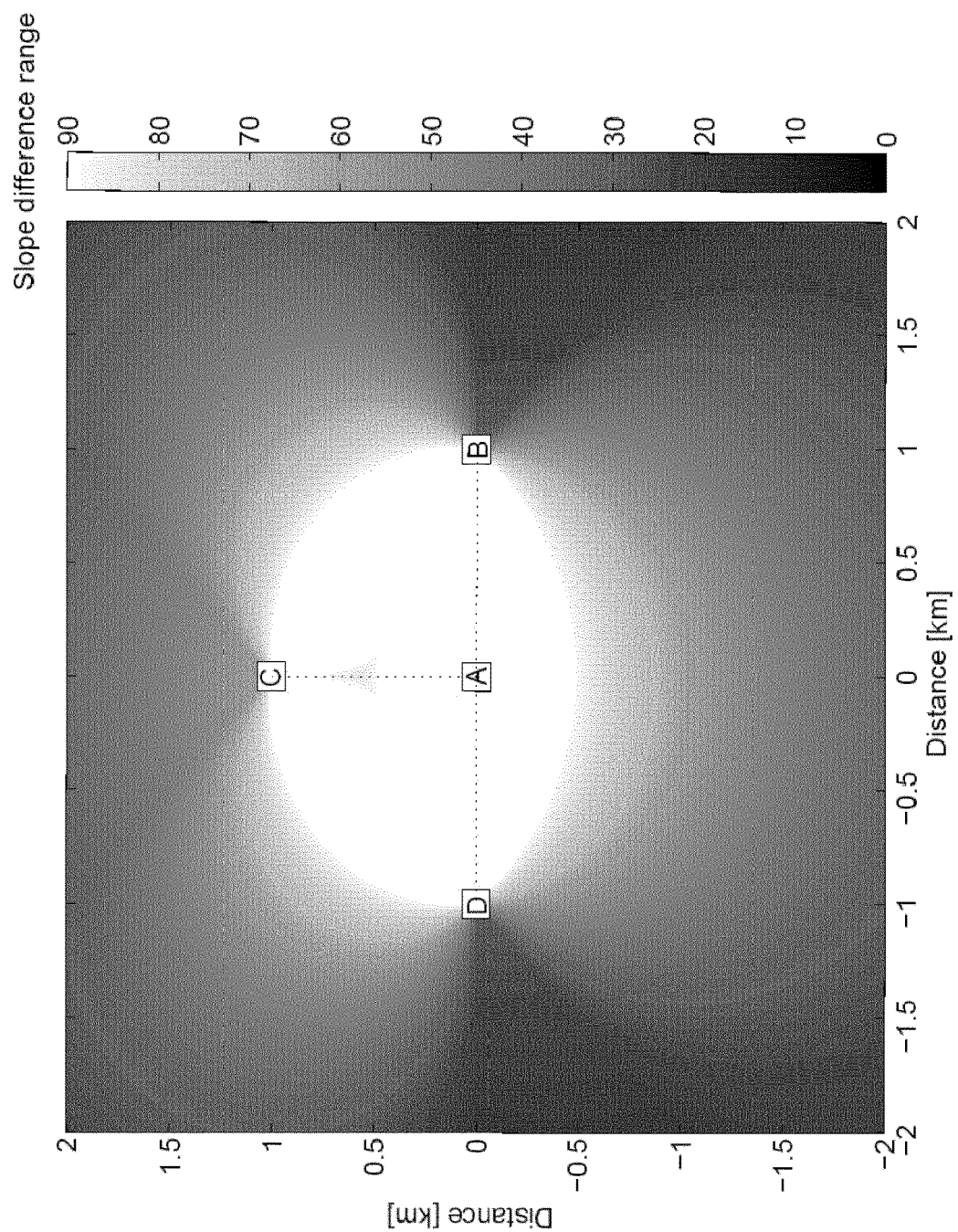
Figure 14:
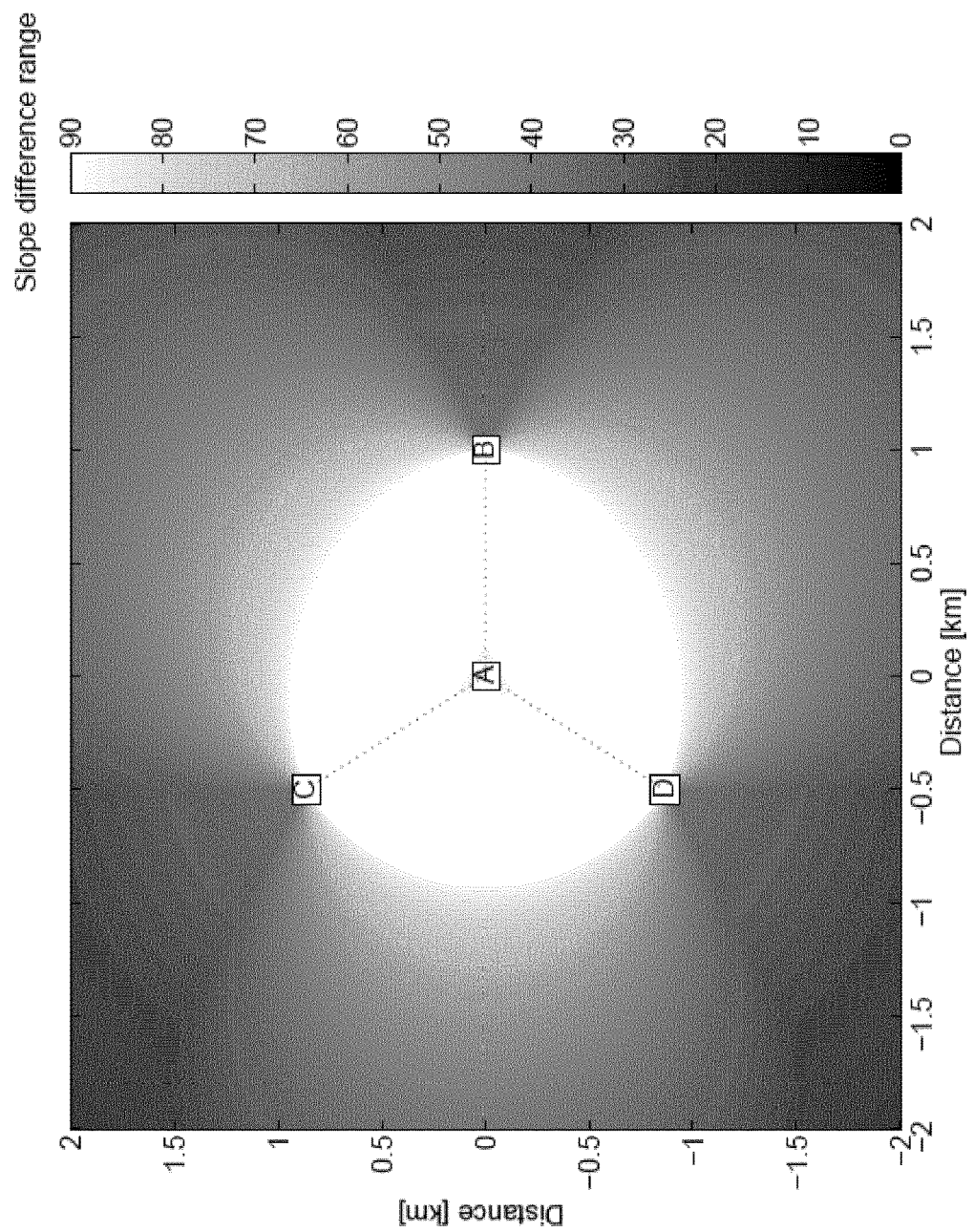

Considering again the example configuration of FIG. 8, three slopes may be obtained, $m_{AB}$, $m_{AC}$, $m_{AD}$, corresponding to the hyperbolae generated when their foci are placed at nodes A and B, nodes A and C and nodes A and D. The three calculated slopes may be compared, with the slope difference range obtained by subtracting the two slopes giving the largest magnitude contained within 90°. A 90° intersection between two hyperbolae at a given point P would be the most favourable slope difference range, corresponding to perpendicular hyperbolae. The presence of local minima is strongly associated with quasi parallel hyperbolae in a local area. FIGS. 11 to 14 illustrate slope difference ranges for different node configurations. FIG. 11 shows a straight line configuration, FIG. 12 shows a rectangular configuration, FIG. 13 shows a T configuration and FIG. 14 shows a star configuration. In all configurations, the centre of mass of the nodes was fixed as an initial value in which a positioning algorithm starts running, and node A was taken as the reference node. Areas of white or very pale shading in the Figures represent a slope difference range of close to 90° and hence are free of local minima. In contrast, areas in dark grey and black represent a slope difference range of less than 35°, meaning the absence of local minima in these areas cannot be assured.

It can be seen from FIG. 11 that a straight line configuration offers poor location accuracy owing to the large areas of dark grey and the fact that two different intersections of all three hyperbolae will always be formed, one representing the real position of a wireless terminal and the second representing a mirror image. Additional information would thus be needed to identify the correct solution.

Figure 15:
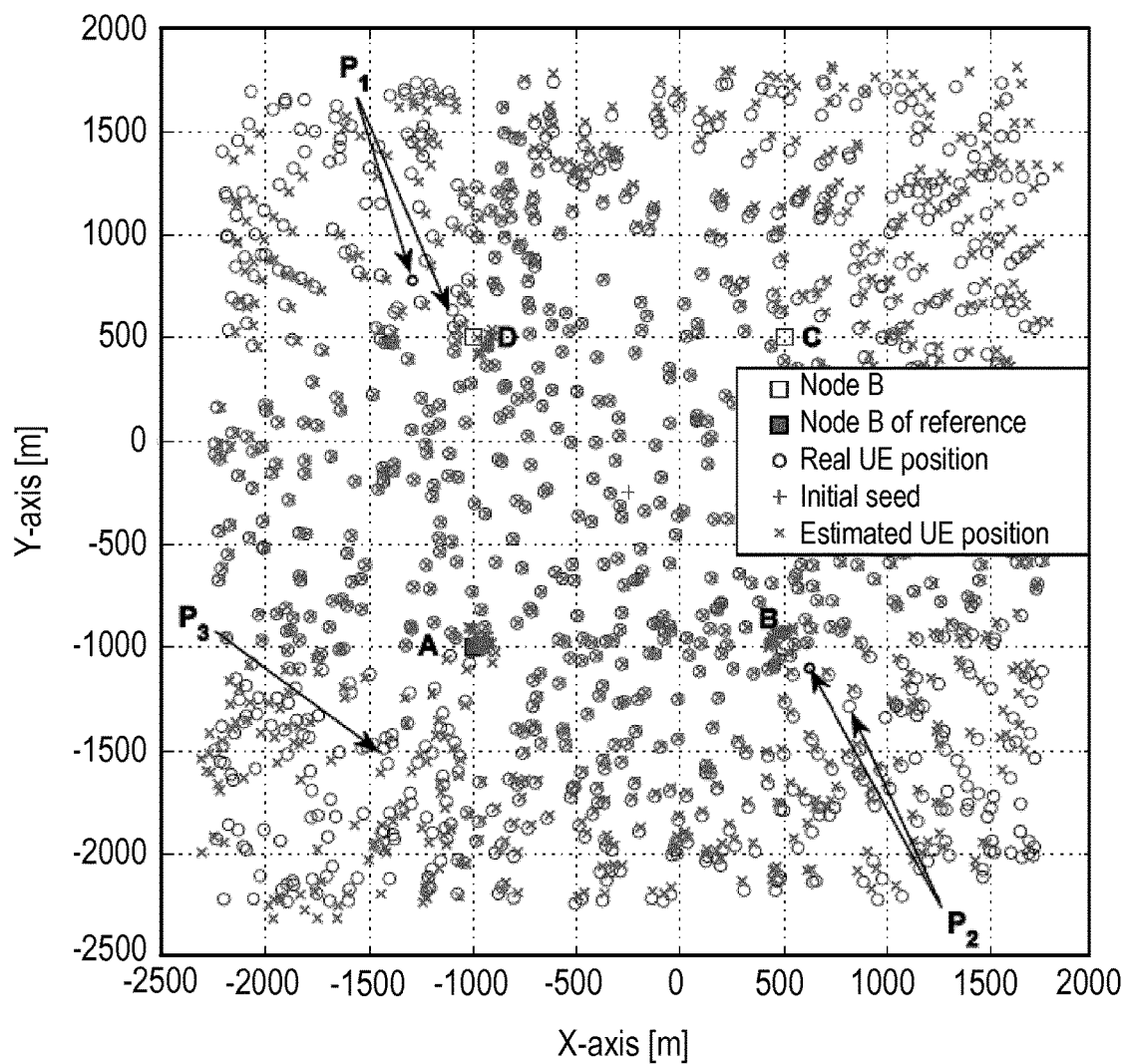
FIG. 15 is a graph illustrating positional error on location wireless terminals using nodes in a rectangular configuration.

FIGS. 12 and 13, showing a rectangular and a T configuration represent better accuracy but still demonstrate smaller slope difference ranges outside of the node group. The error associated with small slope difference ranges is illustrated in FIG. 15, which shows the results of a test case of 1000 wireless terminals reporting four nodes in a rectangular configuration, similar to that of FIG. 12. It may be observed that wireless terminals located in areas of high slope difference range (white areas within the rectangle of four nodes) are located with relatively high accuracy. However, increasing errors are observed behind the nodes, particularly behind nodes B and D. As an illustrative example, the pair of points P1 in FIG. 15 indicate two different real wireless terminal positions whose corresponding position estimates have been placed near node D forming an area of local minima. It can be seen from FIG. 12 that these positions are in an area having a slope difference range of less than 20°. A similar situation is observed for points P2 and P3 in FIG. 15. Points P3 for example are located in an area that can be seen from FIG. 12 to have a slope difference range of 35°, and their position estimates are grouped near node A, in another area of local minima.

Comparative assessment of FIG. 14, showing a star configuration, with FIGS. 11, 12 and 13, demonstrates that the slope difference range, even behind the nodes in the configuration, is more favourable for a star configuration than for any of the other illustrated configurations.

Figure 16:
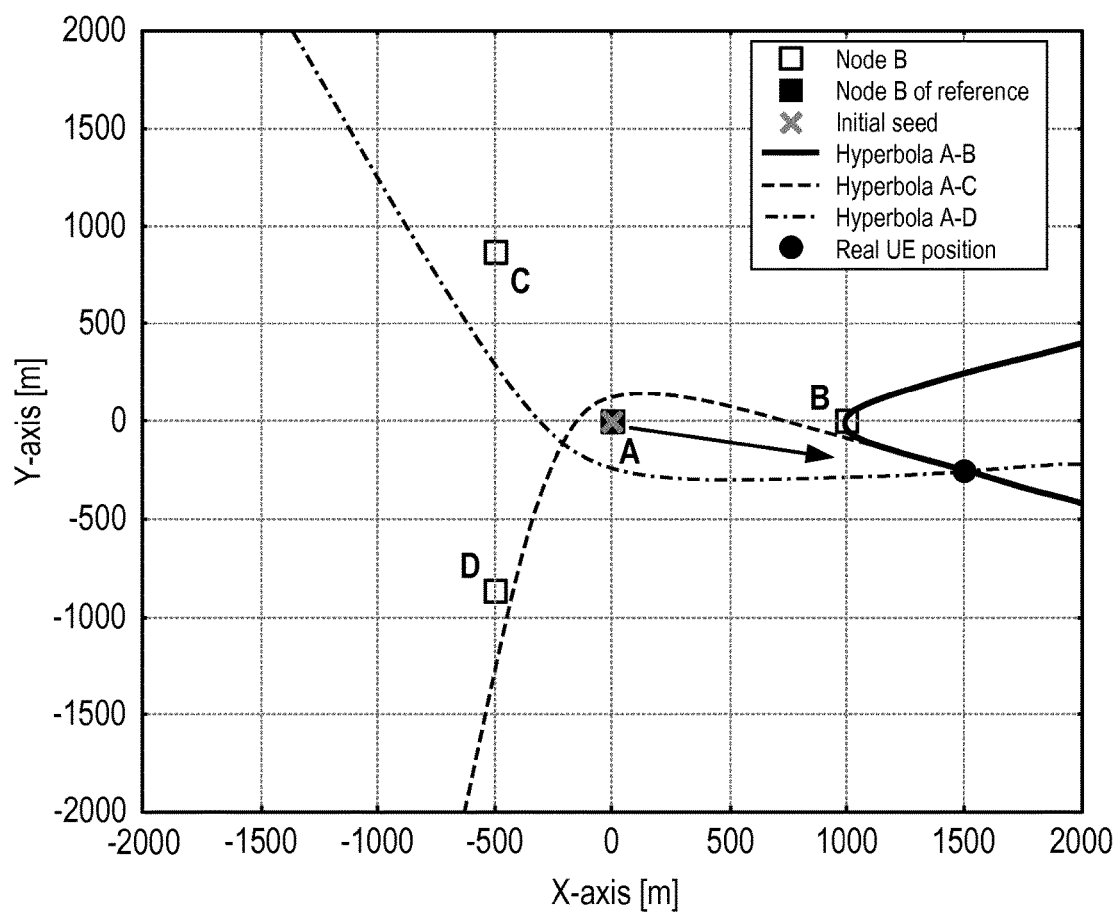
FIG. 16 is a graph illustrating a process of locating a wireless terminal using nodes in a star configuration in one embodiment of the present invention.

Slope difference range is thus another factor that may influence local minima. Areas with a slope difference range considerably less than 90° may be affected by local minima. The configurations illustrated in FIGS. 11 to 13 are all susceptible to the formation of local minima in this respect. In contrast, in the star configuration of FIG. 14, it is always possible to arrive at the real wireless terminal location without crossing any of the three possible focal axes, as illustrated in the representative situation shown in FIG. 16. The star configuration is therefore shown to be robust against the formation of local minima.

As discussed above, the example methods of FIGS. 7 and 10 for identifying nodes in a communications network may be conducted by a network element. Apparatus for conducting the methods described above, for example on receipt of suitable computer readable instructions, may be incorporated within a network element such as a basestation, core network element or any other suitable network element. FIG. 17 illustrates functional units in a network element 700 which may execute the steps of the methods of FIGS. 7 and 10, for example according to computer readable instructions received from a computer program. It will be understood that the units illustrated in FIG. 17 are functional units, and may be realised in any appropriate combination of hardware and/or software.

In one embodiment the network element 700 configured for identifying nodes in a communications network for use in locating wireless terminals within the network based upon reports from the wireless terminals of transmissions received from the nodes comprises an identifying unit 790. The identifying unit 790 is configured to prioritise combinations of nodes in which at least three nodes are located around a reference node in a configuration satisfying similarity criteria to an idealised star configuration.

Figure 17:
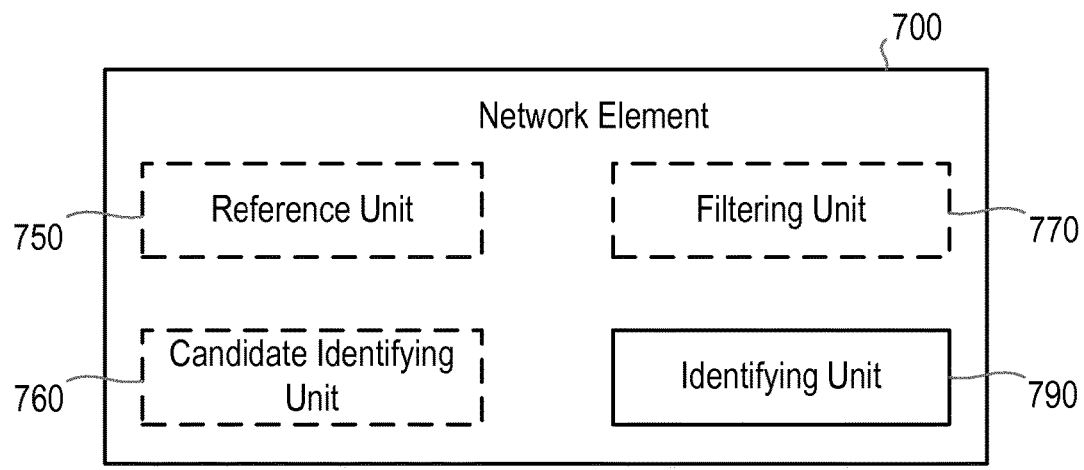
FIG. 17 is a block diagram illustrating functional units in another network element in one embodiment of the present invention.

With reference to FIG. 17, the network element 700 comprises an identifying unit 790. The network element 700 may also comprise a reference unit 750, a candidate identifying unit 770 a filtering unit 770 and an optional weighting unit (not shown). The identifying unit 790 is configured to prioritise combinations of nodes in which at least three nodes are located around a reference node in a configuration satisfying similarity criteria to an idealised star configuration. The reference unit 750 may be configured to select a reference node. The candidate identifying unit 760 may be configured to identify candidate combinations of the reference node with at least three other nodes within a threshold radius from the reference node. The filtering unit 770 may be configured to eliminate candidate combinations failing to satisfy filtering criteria. The identifying unit 790 may be configured to prioritise from among the remaining candidate combinations forwarded from the filtering unit 770.

Figure 18:
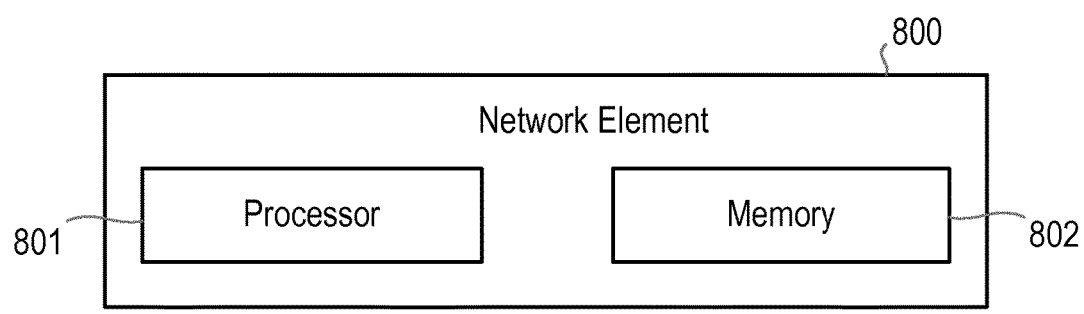
FIG. 18 is a block diagram illustrating functional units in another network element in one embodiment of the present invention.

FIG. 18 illustrates another example of network element 800 which may be configured to conduct any of the methods of FIG. 2, 3, 7 or 10. The network element 800 comprises a processor 801 and a memory 802. The memory 802 contains instructions executable by the processor 801 such that the network element 800 is operative to conduct the steps of any of the methods of FIG. 2, 3, 7 or 10 above.

Aspects of the present invention thus provide both a method for locating wireless terminals in a network and a method for identifying network nodes for use in a locating process. Examples of the locating method simultaneously determine the location of a plurality of wireless terminals and the relative time differences (RTDs) of the network nodes used in the locating process. In this manner, the methods not only locate the wireless terminals but recover synchronisation in the network, enabling the location of additional wireless terminals which may for example report only a limited number of network nodes. Redundancy may be introduced into examples of the methods, further increasing location accuracy. The location methods of the present invention, and other location methods, may be enhanced through the use of network nodes identified according to examples of the method for identifying network nodes of the present invention. The identifying methods prioritise combinations of nodes satisfying similarity criteria to an idealised star configuration. As discussed above, such a star configuration offers increased accuracy in location processes, being highly robust to the formation of local minima. Additional filtering criteria may also be imposed to maximise the useful information that may be obtained from the identified nodes. By significantly reducing the formation of local minima through identification of nodes, errors in location methods may be significantly reduced.

The methods of the present invention offer several advantages over known positioning methods. For example, the methods are not dependent on GPS or any other external positioning technology, and thus may be independently managed within the network. In addition, economic cost is considerably reduced as dedicated timing units such as the LMUs commonly deployed in unsynchronised networks are not required. A complex antenna array structure is also not required, as the methods make efficient use of existing node placements. An optimal node configuration may be selected from among existing sites without additional overhead cost or investment.

As discussed in detail above, example methods of the present invention afford greater positioning accuracy, through the identification of node configurations that are robust against the formation of local minima. Examples of the methods also impose a relatively low computational load, particularly when compared with prior iterative solutions. Examples of the methods may be implemented in any communications network and are not limited to any particular standard or network architecture.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned examples illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of identifying nodes in a communications network for use in locating wireless terminals within the communications network based upon reports from the wireless terminals of transmissions received from the nodes, the method comprising:
   prioritising combinations of nodes by eliminating candidate nodes that fail to satisfy filtering criteria of a time difference band, in which at least three nodes are located around a reference node in a configuration satisfying similarity criteria to an idealised star configuration, wherein the filtering criteria of the time difference band are based upon time difference bands between the reference node and each of other nodes in a combination, wherein the time difference band between two nodes is defined by representative maximum and minimum reported time differences between arrival at a wireless terminal of transmissions from the two nodes, and
   wherein the idealised star configuration comprises three nodes evenly angularly distributed around, and at the same distance from, the reference node.

2. The method as claimed in claim 1, wherein the idealised star configuration further comprises the three nodes located at a distance from the reference node that is above a minimum threshold.

3. The method as claimed in claim 1, wherein the similarity criteria comprise an angular distribution around the reference node that differs from an even angular distribution by less than a maximum amount, and a ratio of maximum to minimum distance from the reference node to any one of the three nodes that is less than a defined maximum ratio.

4. The method as claimed in claim 1, wherein the similarity criteria comprise an angular distribution within 20 degrees of an even distribution around the reference node and a maximum ratio of maximum to minimum distance from the reference node to any one of the three nodes of 3:1.

5. The method as claimed in claim 1, wherein prioritising comprises weighting combinations of at least four nodes according to similarity of said combinations to the idealised star configuration, and prioritising based on said weighting values.

6. The method as claimed in claim 1, further comprising:
   selecting the reference node;
   identifying candidate combinations of the reference node with at least three other nodes within a threshold radius from the reference node; and
   prioritising from among the remaining candidate combinations.

7. The method as claimed in claim 1, wherein the filtering criteria of the time difference band comprise at least one of:
   a minimum number of reports within at least one of the time difference bands of the combination;
   a maximum size for any one of the time difference bands of the combination; and
   a minimum threshold for evenness of a distribution of the reports within the at least one of the time difference bands of the combination.

8. A network element configured for identifying nodes in a communications network for use in locating wireless terminals within the communications network based upon reports from the wireless terminals of transmissions received from the nodes, the network element comprising a processor and a memory, the memory containing instructions executable by the processor whereby the network element is operative to:
  prioritise combinations of nodes, by eliminating candidate nodes that fail to satisfy filtering criteria of a time difference band, in which at least three nodes are located around a reference node in a configuration satisfying similarity criteria to an idealised star configuration, wherein the filtering criteria of the time difference band are based upon time difference bands between the reference node and each of other nodes in a combination, wherein the time difference band between two nodes is defined by representative maximum and minimum reported time differences between arrival at a wireless terminal of transmissions from the two nodes, and
  wherein the idealised star configuration comprises three nodes evenly angularly distributed around, and at the same distance from, the reference node.

9. The network element as claimed in claim 8, wherein the network element is further operative to:
  select the reference node;
  identify candidate combinations of the reference node with at least three other nodes within a threshold radius of the reference node; and
  prioritise from among the remaining candidate combinations.

10. The network element as claimed in claim 8, wherein the network element is further operative to apply the filtering criteria of the time difference band based upon the time difference bands between the reference node and each of the other nodes in the combination, and wherein the time difference band between the two nodes is defined by the maximum and the minimum reported time differences between the arrival at the wireless terminal of the transmissions from the two nodes.

* * * * *